US012794798B2

(12) United States Patent
Dutta

(10) Patent No.: US 12,794,798 B2
(45) Date of Patent: Nov. 10, 2026

(54) MULTICAST RENDEZVOUS POINT DISCOVERY

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 579 days.

(21) Appl. No.: 18/362,621

(22) Filed: Jul. 31, 2023

(65) Prior Publication Data

US 2025/0047587 A1 Feb. 6, 2025

(51) Int. Cl.
*H04L 45/02* (2022.01)
*H04L 45/16* (2022.01)

(52) U.S. Cl.
CPC .............. *H04L 45/02* (2013.01); *H04L 45/16* (2013.01)

(58) Field of Classification Search
CPC ..... H04L 45/02; H04L 45/16; H04L 12/1886; H04L 12/185
See application file for complete search history.

(56) References Cited

U.S. PATENT DOCUMENTS 8,571,029 B1 * 10/2013 Aggarwal ............... H04L 45/50 370/256
2008/0101361 A1 5/2008 Brown
2013/0077628 A1 * 3/2013 Appalla .................. H04L 45/16 370/390
2015/0085635 A1 * 3/2015 Wijnands ................ H04L 45/12 370/216
(Continued)

OTHER PUBLICATIONS

B. Fenner et al., "Protocol Independent Multicast—Sparse Mode (PIM-SM): Protocol Specification (Revised)," Internet Engineering Task Force (IETF), RFC 7761, Mar. 2016.
(Continued)

*Primary Examiner* — Kibrom T Hailu
(74) *Attorney, Agent, or Firm* — Tong, Rea, Bentley & Panagos, LLC

(57) ABSTRACT

Various example embodiments for supporting discovery of multicast rendezvous points for multicast trees are presented herein. Various example embodiments for supporting discovery of multicast rendezvous points for multicast trees may be configured to provide a generic capability for discovery of multicast rendezvous points in various types of communication networks which may utilize various communication protocols. Various example embodiments for supporting discovery of multicast rendezvous points for multicast trees may be configured to support discovery of multicast rendezvous points for multicast trees based on advertising of rendezvous point to multicast group mappings for multicast trees. Various example embodiments for supporting discovery of multicast rendezvous points for multicast trees may be configured to support discovery of multicast rendezvous points for multicast trees based on advertising of rendezvous point to multicast group mappings for multicast trees by flooding/broadcasting the rendezvous point to multicast group mappings through a routing protocol.

26 Claims, 13 Drawing Sheets

(56) References Cited

U.S. PATENT DOCUMENTS

| | | | | |
|---|---|---|---|---|
| 2015/0131660 | A1* | 5/2015 | Shepherd | H04L 45/74 370/390 |
| 2018/0013574 | A1 | 1/2018 | Xie et al. | |
| 2019/0116053 | A1* | 4/2019 | Allan | H04L 12/4633 |
| 2021/0091968 | A1* | 3/2021 | Kumar M R | H04L 12/1877 |

OTHER PUBLICATIONS

Ij. Wijnands et al., "Label Distribution Protocol Extensions for Point-to-Multipoint and Multipoint-to-Multipoint Label Switched Paths," Internet Engineering Task Force (IETF), RFC 6388, Nov. 2011.

N. Bhaskar et al., "Bootstrap Router (BSR) Mechanism for Protocol Independent Multicast (PIM)," Network Working Group, RFC 5059, Jan. 2008.

J. Moy, "OSPF Version 2," Network Working Group, RFC 2328, Apr. 1998.

R. Coltun, et al., "OSPF for IPv6," Network Working Group, RFC 5340, Jul. 2008.

Y. Rekhter et al., "A Border Gateway Protocol 4 (BGP-4)," Network Working Group, RFC 4271, Jan. 2006.

H. Gredler et al., "North-Bound Distribution of Link-State and Traffic Engineering (TE) Information Using BGP," Internet Engineering Task Force (IETF), RFC 7752, Mar. 2016.

D. Oran, "OSI IS-IS lntra-domain Routing Protocol," Network Working Group, RFC 1142, Feb. 1990.

T. Bates, "Multiprotocol Extensions for BGP-4," Network Working Group, RFC 4760, Jan. 2007.

Extended European Search Report, Application No. 24183788.9-1215, dated Dec. 19, 2024, 11 pages.

* cited by examiner

RP-TO-GROUP MAPPING ELEMENT SUB-TLV 600

*FIG. 7*

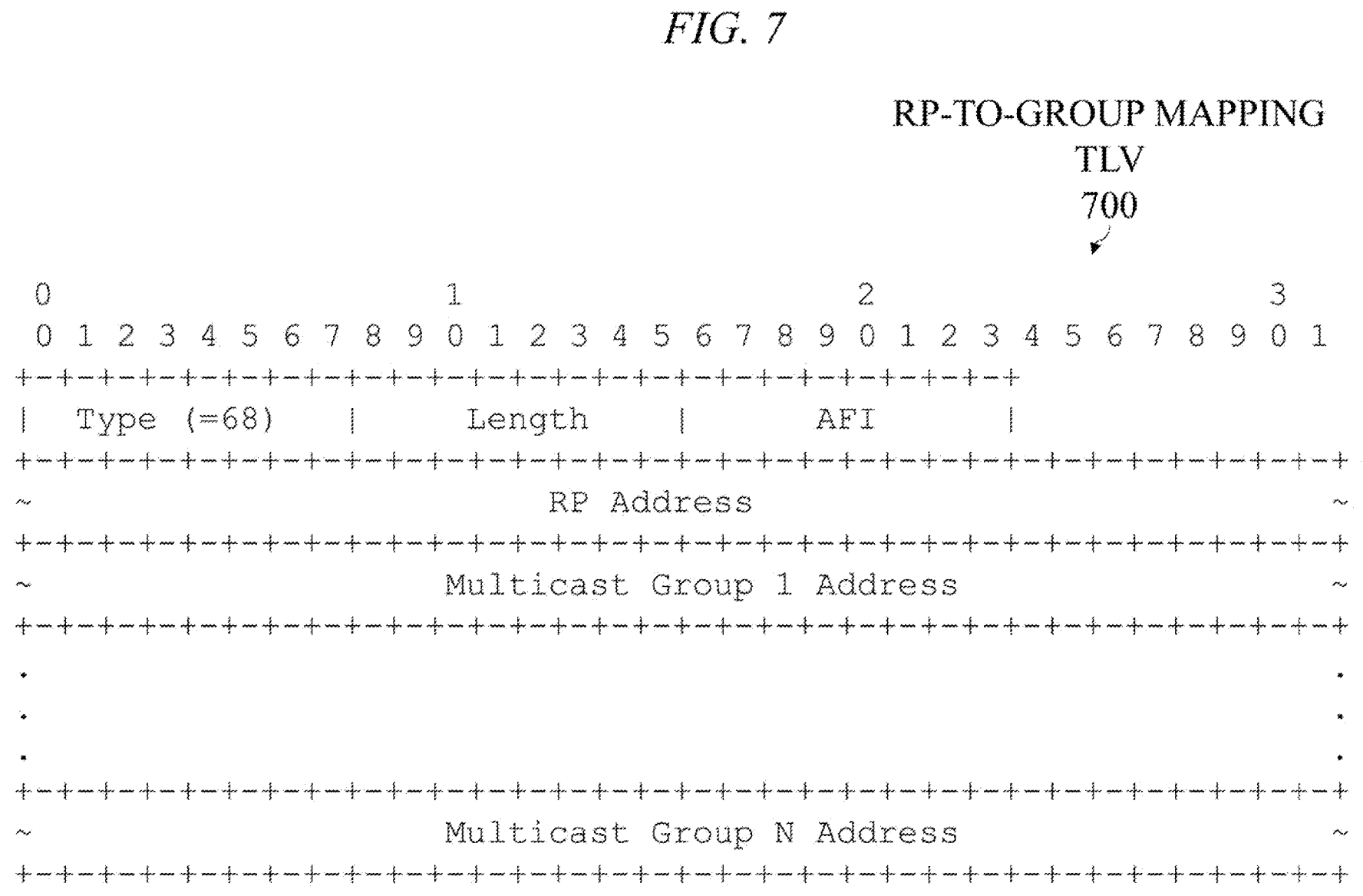

RP-TO-GROUP MAPPING
TLV
700

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+
|  Type (=68)   |     Length    |       AFI     |
+-+-+-+-+-+-+-+-+-+-+-+-+-+-+-+-+-+-+-+-+-+-+-+-+-+-+-+-+-+-+-+-+
~                          RP Address                           ~
+-+-+-+-+-+-+-+-+-+-+-+-+-+-+-+-+-+-+-+-+-+-+-+-+-+-+-+-+-+-+-+-+
~                  Multicast Group 1 Address                    ~
+-+-+-+-+-+-+-+-+-+-+-+-+-+-+-+-+-+-+-+-+-+-+-+-+-+-+-+-+-+-+-+-+
.                                                               .
.                                                               .
.                                                               .
+-+-+-+-+-+-+-+-+-+-+-+-+-+-+-+-+-+-+-+-+-+-+-+-+-+-+-+-+-+-+-+-+
~                  Multicast Group N Address                    ~
+-+-+-+-+-+-+-+-+-+-+-+-+-+-+-+-+-+-+-+-+-+-+-+-+-+-+-+-+-+-+-+-+
```

*FIG. 8*

MP_REACH_NLRI
800

| |
|---|
| Address Family Identifier (2 octets) |
| Subsequent Address Family Identifier (1 octet) |
| Length of Next Hop Network Address (1 octet) |
| Network Address of Next Hop (variable) |
| Reserved (1 octet) |
| Network Layer Reachability Information (variable) |

FIG. 9

MP_UNREACH_NLRI 900

| |
|---|
| Address Family Identifier (2 octets) |
| Subsequent Address Family Identifier (1 octet) |
| Withdrawn Routes (variable) |

RP-TO-GROUP MAPPING 1000

MULTICAST RENDEZVOUS POINT DISCOVERY

TECHNICAL FIELD

Various example embodiments relate generally to communication systems and, more particularly but not exclusively, to supporting discovery of multicast rendezvous points.

BACKGROUND

In communication networks, various communications technologies may be used to support various types of communications.

SUMMARY

In at least some example embodiments, an apparatus includes at least one processor and at least one memory including instructions which, when executed by the at least one processor, cause the apparatus at least to determine a rendezvous point mapping that maps a list of multicast groups for which a node is interested in operating as a rendezvous point to an identifier of the node to be used as an identifier of the rendezvous point, determine a routing protocol to be used by the node for advertising the rendezvous point mapping, generate, based on the routing protocol, a routing protocol message including the rendezvous point mapping, and advertise the routing protocol message including the rendezvous point mapping. In at least some example embodiments, to determine the rendezvous point mapping, the instructions, when executed by the at least one processor, cause the apparatus at least to obtain the list of multicast groups for which the node is interested in operating as the rendezvous point, obtain the identifier of the node to be used as the identifier of the rendezvous point, and generate the rendezvous point mapping by associating the list of multicast groups for which the node is interested in operating as the rendezvous point to the identifier of the node to be used as the identifier of the rendezvous point. In at least some example embodiments, the node has a plurality of neighbor nodes associated therewith, and, to advertise the routing protocol message including the rendezvous point mapping, the instructions, when executed by the at least one processor, cause the apparatus at least to forward the routing protocol message including the rendezvous point mapping toward each of the neighbor nodes associated therewith. In at least some example embodiments, the routing protocol includes one of an Open Shortest Path First (OSPF) protocol, an OSPF version 3 (OSPFv3) protocol, an Intermediate-System-to-Intermediate-System (IS-IS) protocol, a Border Gateway Protocol (BGP), or a BGP-Link State (BGP-LS) protocol. In at least some example embodiments, the routing protocol includes an Open Shortest Path First (OSPF) protocol, the routing protocol message includes an Opaque Link State Advertisement (LSA), and the rendezvous point mapping is included within a payload of the Opaque LSA. In at least some example embodiments, the Opaque LSA Header includes an LSA Type field and an LSA Identifier field, the LSA Type field includes a value based on flooding scope, the LSA Identifier field is split into an Opaque Type field and an Opaque Identifier field, and the Opaque Type field includes a value indicative that the Opaque LSA includes rendezvous point mapping information. In at least some example embodiments, the rendezvous point mapping is included within a sub-Type-Length-Value (sub-TLV) included within the payload of the Opaque LSA, the sub-TLV includes a rendezvous point address field that includes the identifier of the node to be used as the identifier of the rendezvous point, and the sub-TLV includes a set of one or more multicast address fields that include respective multicast addresses for the respective multicast groups for which the node is interested in operating as the rendezvous point. In at least some example embodiments, the routing protocol includes an Intermediate-System-to-Intermediate-System (IS-IS) protocol, the routing protocol message includes an IS-IS Protocol Data Unit (PDU), and the rendezvous point mapping is included within a Type-Length-Value (TLV) of the IS-IS PDU. In at least some example embodiments, the TLV of the IS-IS PDU includes a Type field that encodes a value indicative that the IS-IS PDU includes rendezvous point mapping information and a Value field that includes the rendezvous point mapping. In at least some example embodiments, the Value field includes an Address Family Identifier (AFI) field, the Value field includes a rendezvous point address field that includes the identifier of the node to be used as the identifier of the rendezvous point, and the Value field includes a set of one or more multicast address fields that include respective multicast addresses for the respective multicast groups for which the node is interested in operating as the rendezvous point. In at least some example embodiments, the routing protocol includes a Border Gateway Protocol (BGP), the routing protocol message includes a BGP message including Network Layer Reachability Information (NLRI), and the rendezvous point mapping is included within the NLRI. In at least some example embodiments, the NLRI includes a Subsequent Address Family Identifier (SAFI) field and an NLRI field, the SAFI field includes a value indicative that the NLRI includes rendezvous point mapping information, the NLRI field includes a rendezvous point address field that includes the identifier of the node to be used as the identifier of the rendezvous point, and the NLRI field includes a set of one or more multicast address fields that include respective multicast addresses for the respective multicast groups for which the node is interested in operating as the rendezvous point.

In at least some example embodiments, a non-transitory computer readable medium includes computer program instructions which, when executed by an apparatus, cause the apparatus at least to determine a rendezvous point mapping that maps a list of multicast groups for which a node is interested in operating as a rendezvous point to an identifier of the node to be used as an identifier of the rendezvous point, determine a routing protocol to be used by the node for advertising the rendezvous point mapping, generate, based on the routing protocol, a routing protocol message including the rendezvous point mapping, and advertise the routing protocol message including the rendezvous point mapping. In at least some example embodiments, to determine the rendezvous point mapping, the computer program instructions, when executed by the apparatus, cause the apparatus at least to obtain the list of multicast groups for which the node is interested in operating as the rendezvous point, obtain the identifier of the node to be used as the identifier of the rendezvous point, and generate the rendezvous point mapping by associating the list of multicast groups for which the node is interested in operating as the rendezvous point to the identifier of the node to be used as the identifier of the rendezvous point. In at least some example embodiments, the node has a plurality of neighbor nodes associated therewith, and, to advertise the routing protocol message including the rendezvous point mapping, the computer program instructions, when executed by the apparatus, cause the apparatus at least to forward the routing protocol message including the rendezvous point mapping toward each of the neighbor nodes associated therewith. In at least some example embodiments, the routing protocol includes one of an Open Shortest Path First (OSPF) protocol, an OSPF version 3 (OSPFv3) protocol, an Intermediate-System-to-Intermediate-System (IS-IS) protocol, a Border Gateway Protocol (BGP), or a BGP-Link State (BGP-LS) protocol. In at least some example embodiments, the routing protocol includes an Open Shortest Path First (OSPF) protocol, the routing protocol message includes an Opaque Link State Advertisement (LSA), and the rendezvous point mapping is included within a payload of the Opaque LSA. In at least some example embodiments, the Opaque LSA Header includes an LSA Type field and an LSA Identifier field, the LSA Type field includes a value based on flooding scope, the LSA Identifier field is split into an Opaque Type field and an Opaque Identifier field, and the Opaque Type field includes a value indicative that the Opaque LSA includes rendezvous point mapping information. In at least some example embodiments, the rendezvous point mapping is included within a sub-Type-Length-Value (sub-TLV) included within the payload of the Opaque LSA, the sub-TLV includes a rendezvous point address field that includes the identifier of the node to be used as the identifier of the rendezvous point, and the sub-TLV includes a set of one or more multicast address fields that include respective multicast addresses for the respective multicast groups for which the node is interested in operating as the rendezvous point. In at least some example embodiments, the routing protocol includes an Intermediate-System-to-Intermediate-System (IS-IS) protocol, the routing protocol message includes an IS-IS Protocol Data Unit (PDU), and the rendezvous point mapping is included within a Type-Length-Value (TLV) of the IS-IS PDU. In at least some example embodiments, the TLV of the IS-IS PDU includes a Type field that encodes a value indicative that the IS-IS PDU includes rendezvous point mapping information and a Value field that includes the rendezvous point mapping. In at least some example embodiments, the Value field includes an Address Family Identifier (AFI) field, the Value field includes a rendezvous point address field that includes the identifier of the node to be used as the identifier of the rendezvous point, and the Value field includes a set of one or more multicast address fields that include respective multicast addresses for the respective multicast groups for which the node is interested in operating as the rendezvous point. In at least some example embodiments, the routing protocol includes a Border Gateway Protocol (BGP), the routing protocol message includes a BGP message including Network Layer Reachability Information (NLRI), and the rendezvous point mapping is included within the NLRI. In at least some example embodiments, the NLRI includes a Subsequent Address Family Identifier (SAFI) field and an NLRI field, the SAFI field includes a value indicative that the NLRI includes rendezvous point mapping information, the NLRI field includes a rendezvous point address field that includes the identifier of the node to be used as the identifier of the rendezvous point, and the NLRI field includes a set of one or more multicast address fields that include respective multicast addresses for the respective multicast groups for which the node is interested in operating as the rendezvous point.

In at least some example embodiments, a method includes determining a rendezvous point mapping that maps a list of multicast groups for which a node is interested in operating as a rendezvous point to an identifier of the node to be used as an identifier of the rendezvous point, determining a routing protocol to be used by the node for advertising the rendezvous point mapping, generating, based on the routing protocol, a routing protocol message including the rendezvous point mapping, and advertising the routing protocol message including the rendezvous point mapping. In at least some example embodiments, determining the rendezvous point mapping includes obtaining the list of multicast groups for which the node is interested in operating as the rendezvous point, obtaining the identifier of the node to be used as the identifier of the rendezvous point, and generating the rendezvous point mapping by associating the list of multicast groups for which the node is interested in operating as the rendezvous point to the identifier of the node to be used as the identifier of the rendezvous point. In at least some example embodiments, the node has a plurality of neighbor nodes associated therewith, and advertising the routing protocol message including the rendezvous point mapping includes forwarding the routing protocol message including the rendezvous point mapping toward each of the neighbor nodes associated therewith. In at least some example embodiments, the routing protocol includes one of an Open Shortest Path First (OSPF) protocol, an OSPF version 3 (OSPFv3) protocol, an Intermediate-System-to-Intermediate-System (IS-IS) protocol, a Border Gateway Protocol (BGP), or a BGP-Link State (BGP-LS) protocol. In at least some example embodiments, the routing protocol includes an Open Shortest Path First (OSPF) protocol, the routing protocol message includes an Opaque Link State Advertisement (LSA), and the rendezvous point mapping is included within a payload of the Opaque LSA. In at least some example embodiments, the Opaque LSA Header includes an LSA Type field and an LSA Identifier field, the LSA Type field includes a value based on flooding scope, the LSA Identifier field is split into an Opaque Type field and an Opaque Identifier field, and the Opaque Type field includes a value indicative that the Opaque LSA includes rendezvous point mapping information. In at least some example embodiments, the rendezvous point mapping is included within a sub-Type-Length-Value (sub-TLV) included within the payload of the Opaque LSA, the sub-TLV includes a rendezvous point address field that includes the identifier of the node to be used as the identifier of the rendezvous point, and the sub-TLV includes a set of one or more multicast address fields that include respective multicast addresses for the respective multicast groups for which the node is interested in operating as the rendezvous point. In at least some example embodiments, the routing protocol includes an Intermediate-System-to-Intermediate-System (IS-IS) protocol, the routing protocol message includes an IS-IS Protocol Data Unit (PDU), and the rendezvous point mapping is included within a Type-Length-Value (TLV) of the IS-IS PDU. In at least some example embodiments, the TLV of the IS-IS PDU includes a Type field that encodes a value indicative that the IS-IS PDU includes rendezvous point mapping information and a Value field that includes the rendezvous point mapping. In at least some example embodiments, the Value field includes an Address Family Identifier (AFI) field, the Value field includes a rendezvous point address field that includes the identifier of the node to be used as the identifier of the rendezvous point, and the Value field includes a set of one or more multicast address fields that include respective multicast addresses for the respective multicast groups for which the node is interested in operating as the rendezvous point. In at least some example embodiments, the routing protocol includes a Border Gateway Protocol (BGP), the routing protocol message includes a BGP message including Network Layer Reachability Information (NLRI), and the rendezvous point mapping is included within the NLRI. In at least some example embodiments, the NLRI includes a Subsequent Address Family Identifier (SAFI) field and an NLRI field, the SAFI field includes a value indicative that the NLRI includes rendezvous point mapping information, the NLRI field includes a rendezvous point address field that includes the identifier of the node to be used as the identifier of the rendezvous point, and the NLRI field includes a set of one or more multicast address fields that include respective multicast addresses for the respective multicast groups for which the node is interested in operating as the rendezvous point.

In at least some example embodiments, an apparatus includes means for determining a rendezvous point mapping that maps a list of multicast groups for which a node is interested in operating as a rendezvous point to an identifier of the node to be used as an identifier of the rendezvous point, means for determining a routing protocol to be used by the node for advertising the rendezvous point mapping, means for generating, based on the routing protocol, a routing protocol message including the rendezvous point mapping, and means for advertising the routing protocol message including the rendezvous point mapping. In at least some example embodiments, the means for determining the rendezvous point mapping includes means for obtaining the list of multicast groups for which the node is interested in operating as the rendezvous point, means for obtaining the identifier of the node to be used as the identifier of the rendezvous point, and means for generating the rendezvous point mapping by associating the list of multicast groups for which the node is interested in operating as the rendezvous point to the identifier of the node to be used as the identifier of the rendezvous point. In at least some example embodiments, the node has a plurality of neighbor nodes associated therewith, and the means for advertising the routing protocol message including the rendezvous point mapping includes means for forwarding the routing protocol message including the rendezvous point mapping toward each of the neighbor nodes associated therewith. In at least some example embodiments, the routing protocol includes one of an Open Shortest Path First (OSPF) protocol, an OSPF version 3 (OSPFv3) protocol, an Intermediate-System-to-Intermediate-System (IS-IS) protocol, a Border Gateway Protocol (BGP), or a BGP-Link State (BGP-LS) protocol. In at least some example embodiments, the routing protocol includes an Open Shortest Path First (OSPF) protocol, the routing protocol message includes an Opaque Link State Advertisement (LSA), and the rendezvous point mapping is included within a payload of the Opaque LSA. In at least some example embodiments, the Opaque LSA Header includes an LSA Type field and an LSA Identifier field, the LSA Type field includes a value based on flooding scope, the LSA Identifier field is split into an Opaque Type field and an Opaque Identifier field, and the Opaque Type field includes a value indicative that the Opaque LSA includes rendezvous point mapping information. In at least some example embodiments, the rendezvous point mapping is included within a sub-Type-Length-Value (sub-TLV) included within the payload of the Opaque LSA, the sub-TLV includes a rendezvous point address field that includes the identifier of the node to be used as the identifier of the rendezvous point, and the sub-TLV includes a set of one or more multicast address fields that include respective multicast addresses for the respective multicast groups for which the node is interested in operating as the rendezvous point. In at least some example embodiments, the routing protocol includes an Intermediate-System-to-Intermediate-System (IS-IS) protocol, the routing protocol message includes an IS-IS Protocol Data Unit (PDU), and the rendezvous point mapping is included within a Type-Length-Value (TLV) of the IS-IS PDU. In at least some example embodiments, the TLV of the IS-IS PDU includes a Type field that encodes a value indicative that the IS-IS PDU includes rendezvous point mapping information and a Value field that includes the rendezvous point mapping. In at least some example embodiments, the Value field includes an Address Family Identifier (AFI) field, the Value field includes a rendezvous point address field that includes the identifier of the node to be used as the identifier of the rendezvous point, and the Value field includes a set of one or more multicast address fields that include respective multicast addresses for the respective multicast groups for which the node is interested in operating as the rendezvous point. In at least some example embodiments, the routing protocol includes a Border Gateway Protocol (BGP), the routing protocol message includes a BGP message including Network Layer Reachability Information (NLRI), and the rendezvous point mapping is included within the NLRI. In at least some example embodiments, the NLRI includes a Subsequent Address Family Identifier (SAFI) field and an NLRI field, the SAFI field includes a value indicative that the NLRI includes rendezvous point mapping information, the NLRI field includes a rendezvous point address field that includes the identifier of the node to be used as the identifier of the rendezvous point, and the NLRI field includes a set of one or more multicast address fields that include respective multicast addresses for the respective multicast groups for which the node is interested in operating as the rendezvous point.

In at least some example embodiments, an apparatus includes at least one processor and at least one memory including instructions which, when executed by the at least one processor, cause the apparatus at least to receive a routing protocol message including a rendezvous point mapping that maps a list of multicast groups for which a node is interested in operating as a rendezvous point to an identifier of the node to be used as an identifier of the rendezvous point, identify, from the routing protocol message, a routing protocol used to format the routing protocol message, extract, from the routing protocol message based on the routing protocol, the rendezvous point mapping, and process the rendezvous point mapping. In at least some example embodiments, to process the rendezvous point mapping, the instructions, when executed by the at least one processor, cause the apparatus at least to add the rendezvous point mapping to a group to rendezvous point mapping database. In at least some example embodiments, the routing protocol message is received from a neighbor node, and the routing protocol message is advertised to at least one other neighbor node. In at least some example embodiments, the routing protocol includes one of an Open Shortest Path First (OSPF) protocol, an OSPF version 3 (OSPFv3) protocol, an Intermediate-System-to-Intermediate-System (IS-IS) protocol, a Border Gateway Protocol (BGP), or a BGP-Link State (BGP-LS) protocol. In at least some example embodiments, the routing protocol includes an Open Shortest Path First (OSPF) protocol, the routing protocol message includes an Opaque Link State Advertisement (LSA), and the rendezvous point mapping is included within a payload of the Opaque LSA. In at least some example embodiments, the Opaque LSA Header includes an LSA Type field and an LSA Identifier field, the LSA Type field includes a value based on flooding scope, the LSA Identifier field is split into an Opaque Type field and an Opaque Identifier field, w the Opaque Type field includes a value indicative that the Opaque LSA includes rendezvous point mapping information. In at least some example embodiments, the rendezvous point mapping is included within a sub-Type-Length-Value (sub-TLV) included within the payload of the Opaque LSA, the sub-TLV includes a rendezvous point address field that includes the identifier of the node to be used as the identifier of the rendezvous point, and the sub-TLV includes a set of one or more multicast address fields that include respective multicast addresses for the respective multicast groups for which the node is interested in operating as the rendezvous point. In at least some example embodiments, the routing protocol includes an Intermediate-System-to-Intermediate-System (IS-IS) protocol, the routing protocol message includes an IS-IS Protocol Data Unit (PDU), and the rendezvous point mapping is included within a Type-Length-Value (TLV) of the IS-IS PDU. In at least some example embodiments, the TLV of the IS-IS PDU includes a Type field that encodes a value indicative that the IS-IS PDU includes rendezvous point mapping information and a Value field that includes the rendezvous point mapping. In at least some example embodiments, the Value field includes an Address Family Identifier (AFI) field, the Value field includes a rendezvous point address field that includes the identifier of the node to be used as the identifier of the rendezvous point, and the Value field includes a set of one or more multicast address fields that include respective multicast addresses for the respective multicast groups for which the node is interested in operating as the rendezvous point. In at least some example embodiments, the routing protocol includes a Border Gateway Protocol (BGP), the routing protocol message includes a BGP message including Network Layer Reachability Information (NLRI), and the rendezvous point mapping is included within the NLRI. In at least some example embodiments, the NLRI includes a Subsequent Address Family Identifier (SAFI) field and an NLRI field, the SAFI field includes a value indicative that the NLRI includes rendezvous point mapping information, the NLRI field includes a rendezvous point address field that includes the identifier of the node to be used as the identifier of the rendezvous point, and the NLRI field includes a set of one or more multicast address fields that include respective multicast addresses for the respective multicast groups for which the node is interested in operating as the rendezvous point.

In at least some example embodiments, a non-transitory computer readable medium includes computer program instructions which, when executed by an apparatus, cause the apparatus at least to receive a routing protocol message including a rendezvous point mapping that maps a list of multicast groups for which a node is interested in operating as a rendezvous point to an identifier of the node to be used as an identifier of the rendezvous point, identify, from the routing protocol message, a routing protocol used to format the routing protocol message, extract, from the routing protocol message based on the routing protocol, the rendezvous point mapping, and process the rendezvous point mapping. In at least some example embodiments, to process the rendezvous point mapping, the computer program instructions, when executed by the apparatus, cause the apparatus at least to add the rendezvous point mapping to a group to rendezvous point mapping database. In at least some example embodiments, the routing protocol message is received from a neighbor node, and the routing protocol message is advertised to at least one other neighbor node. In at least some example embodiments, the routing protocol includes one of an Open Shortest Path First (OSPF) protocol, an OSPF version 3 (OSPFv3) protocol, an Intermediate-System-to-Intermediate-System (IS-IS) protocol, a Border Gateway Protocol (BGP), or a BGP-Link State (BGP-LS) protocol. In at least some example embodiments, the routing protocol includes an Open Shortest Path First (OSPF) protocol, the routing protocol message includes an Opaque Link State Advertisement (LSA), and the rendezvous point mapping is included within a payload of the Opaque LSA. In at least some example embodiments, the Opaque LSA Header includes an LSA Type field and an LSA Identifier field, the LSA Type field includes a value based on flooding scope, the LSA Identifier field is split into an Opaque Type field and an Opaque Identifier field, w the Opaque Type field includes a value indicative that the Opaque LSA includes rendezvous point mapping information. In at least some example embodiments, the rendezvous point mapping is included within a sub-Type-Length-Value (sub-TLV) included within the payload of the Opaque LSA, the sub-TLV includes a rendezvous point address field that includes the identifier of the node to be used as the identifier of the rendezvous point, and the sub-TLV includes a set of one or more multicast address fields that include respective multicast addresses for the respective multicast groups for which the node is interested in operating as the rendezvous point. In at least some example embodiments, the routing protocol includes an Intermediate-System-to-Intermediate-System (IS-IS) protocol, the routing protocol message includes an IS-IS Protocol Data Unit (PDU), and the rendezvous point mapping is included within a Type-Length-Value (TLV) of the IS-IS PDU. In at least some example embodiments, the TLV of the IS-IS PDU includes a Type field that encodes a value indicative that the IS-IS PDU includes rendezvous point mapping information and a Value field that includes the rendezvous point mapping. In at least some example embodiments, the Value field includes an Address Family Identifier (AFI) field, the Value field includes a rendezvous point address field that includes the identifier of the node to be used as the identifier of the rendezvous point, and the Value field includes a set of one or more multicast address fields that include respective multicast addresses for the respective multicast groups for which the node is interested in operating as the rendezvous point. In at least some example embodiments, the routing protocol includes a Border Gateway Protocol (BGP), the routing protocol message includes a BGP message including Network Layer Reachability Information (NLRI), and the rendezvous point mapping is included within the NLRI. In at least some example embodiments, the NLRI includes a Subsequent Address Family Identifier (SAFI) field and an NLRI field, the SAFI field includes a value indicative that the NLRI includes rendezvous point mapping information, the NLRI field includes a rendezvous point address field that includes the identifier of the node to be used as the identifier of the rendezvous point, and the NLRI field includes a set of one or more multicast address fields that include respective multicast addresses for the respective multicast groups for which the node is interested in operating as the rendezvous point.

In at least some example embodiments, a method includes receiving a routing protocol message including a rendezvous point mapping that maps a list of multicast groups for which a node is interested in operating as a rendezvous point to an identifier of the node to be used as an identifier of the rendezvous point, identifying, from the routing protocol message, a routing protocol used to format the routing protocol message, extracting, from the routing protocol message based on the routing protocol, the rendezvous point mapping, and processing the rendezvous point mapping. In at least some example embodiments, processing the rendezvous point mapping includes adding the rendezvous point mapping to a group to rendezvous point mapping database. In at least some example embodiments, the routing protocol message is received from a neighbor node, and the routing protocol message is advertised to at least one other neighbor node. In at least some example embodiments, the routing protocol includes one of an Open Shortest Path First (OSPF) protocol, an OSPF version 3 (OSPFv3) protocol, an Intermediate-System-to-Intermediate-System (IS-IS) protocol, a Border Gateway Protocol (BGP), or a BGP-Link State (BGP-LS) protocol. In at least some example embodiments, the routing protocol includes an Open Shortest Path First (OSPF) protocol, the routing protocol message includes an Opaque Link State Advertisement (LSA), and the rendezvous point mapping is included within a payload of the Opaque LSA. In at least some example embodiments, the Opaque LSA Header includes an LSA Type field and an LSA Identifier field, the LSA Type field includes a value based on flooding scope, the LSA Identifier field is split into an Opaque Type field and an Opaque Identifier field, w the Opaque Type field includes a value indicative that the Opaque LSA includes rendezvous point mapping information. In at least some example embodiments, the rendezvous point mapping is included within a sub-Type-Length-Value (sub-TLV) included within the payload of the Opaque LSA, the sub-TLV includes a rendezvous point address field that includes the identifier of the node to be used as the identifier of the rendezvous point, and the sub-TLV includes a set of one or more multicast address fields that include respective multicast addresses for the respective multicast groups for which the node is interested in operating as the rendezvous point. In at least some example embodiments, the routing protocol includes an Intermediate-System-to-Intermediate-System (IS-IS) protocol, the routing protocol message includes an IS-IS Protocol Data Unit (PDU), and the rendezvous point mapping is included within a Type-Length-Value (TLV) of the IS-IS PDU. In at least some example embodiments, the TLV of the IS-IS PDU includes a Type field that encodes a value indicative that the IS-IS PDU includes rendezvous point mapping information and a Value field that includes the rendezvous point mapping. In at least some example embodiments, the Value field includes an Address Family Identifier (AFI) field, the Value field includes a rendezvous point address field that includes the identifier of the node to be used as the identifier of the rendezvous point, and the Value field includes a set of one or more multicast address fields that include respective multicast addresses for the respective multicast groups for which the node is interested in operating as the rendezvous point. In at least some example embodiments, the routing protocol includes a Border Gateway Protocol (BGP), the routing protocol message includes a BGP message including Network Layer Reachability Information (NLRI), and the rendezvous point mapping is included within the NLRI. In at least some example embodiments, the NLRI includes a Subsequent Address Family Identifier (SAFI) field and an NLRI field, the SAFI field includes a value indicative that the NLRI includes rendezvous point mapping information, the NLRI field includes a rendezvous point address field that includes the identifier of the node to be used as the identifier of the rendezvous point, and the NLRI field includes a set of one or more multicast address fields that include respective multicast addresses for the respective multicast groups for which the node is interested in operating as the rendezvous point.

In at least some example embodiments, an apparatus includes means for receiving a routing protocol message including a rendezvous point mapping that maps a list of multicast groups for which a node is interested in operating as a rendezvous point to an identifier of the node to be used as an identifier of the rendezvous point, means for identifying, from the routing protocol message, a routing protocol used to format the routing protocol message, means for extracting, from the routing protocol message based on the routing protocol, the rendezvous point mapping, and means for processing the rendezvous point mapping. In at least some example embodiments, the means for processing the rendezvous point mapping includes means for adding the rendezvous point mapping to a group to rendezvous point mapping database. In at least some example embodiments, the routing protocol message is received from a neighbor node, and the routing protocol message is advertised to at least one other neighbor node. In at least some example embodiments, the routing protocol includes one of an Open Shortest Path First (OSPF) protocol, an OSPF version 3 (OSPFv3) protocol, an Intermediate-System-to-Intermediate-System (IS-IS) protocol, a Border Gateway Protocol (BGP), or a BGP-Link State (BGP-LS) protocol. In at least some example embodiments, the routing protocol includes an Open Shortest Path First (OSPF) protocol, the routing protocol message includes an Opaque Link State Advertisement (LSA), and the rendezvous point mapping is included within a payload of the Opaque LSA. In at least some example embodiments, the Opaque LSA Header includes an LSA Type field and an LSA Identifier field, the LSA Type field includes a value based on flooding scope, the LSA Identifier field is split into an Opaque Type field and an Opaque Identifier field, w the Opaque Type field includes a value indicative that the Opaque LSA includes rendezvous point mapping information. In at least some example embodiments, the rendezvous point mapping is included within a sub-Type-Length-Value (sub-TLV) included within the payload of the Opaque LSA, the sub-TLV includes a rendezvous point address field that includes the identifier of the node to be used as the identifier of the rendezvous point, and the sub-TLV includes a set of one or more multicast address fields that include respective multicast addresses for the respective multicast groups for which the node is interested in operating as the rendezvous point. In at least some example embodiments, the routing protocol includes an Intermediate-System-to-Intermediate-System (IS-IS) protocol, the routing protocol message includes an IS-IS Protocol Data Unit (PDU), and the rendezvous point mapping is included within a Type-Length-Value (TLV) of the IS-IS PDU. In at least some example embodiments, the TLV of the IS-IS PDU includes a Type field that encodes a value indicative that the IS-IS PDU includes rendezvous point mapping information and a Value field that includes the rendezvous point mapping. In at least some example embodiments, the Value field includes an Address Family Identifier (AFI) field, the Value field includes a rendezvous point address field that includes the identifier of the node to be used as the identifier of the rendezvous point, and the Value field includes a set of one or more multicast address fields that include respective multicast addresses for the respective multicast groups for which the node is interested in operating as the rendezvous point. In at least some example embodiments, the routing protocol includes a Border Gateway Protocol (BGP), the routing protocol message includes a BGP message including Network Layer Reachability Information (NLRI), and the rendezvous point mapping is included within the NLRI. In at least some example embodiments, the NLRI includes a Subsequent Address Family Identifier (SAFI) field and an NLRI field, the SAFI field includes a value indicative that the NLRI includes rendezvous point mapping information, the NLRI field includes a rendezvous point address field that includes the identifier of the node to be used as the identifier of the rendezvous point, and the NLRI field includes a set of one or more multicast address fields that include respective multicast addresses for the respective multicast groups for which the node is interested in operating as the rendezvous point.

BRIEF DESCRIPTION OF THE DRAWINGS

The teachings herein can be readily understood by considering the following detailed description in conjunction with the accompanying drawings, in which:

FIG. 7 depicts an example embodiment of an RP-to-group mapping TLV configured to support discovery of multicast RPs for multicast trees in Intermediate-System-to-Intermediate-System (IS-IS);

FIG. 8 depicts an example embodiment of a Network Layer Reachability Information (NLRI) element for use in supporting discovery of multicast RPs for multicast trees in Border Gateway Protocol (BGP);

FIG. 9 depicts an example embodiment of a Network Layer Reachability Information (NLRI) element for use in supporting discovery of multicast RPs for multicast trees in BGP;

To facilitate understanding, identical reference numerals have been used herein, wherever possible, in order to designate identical elements that are common among the various figures.

DETAILED DESCRIPTION

Figure 1:
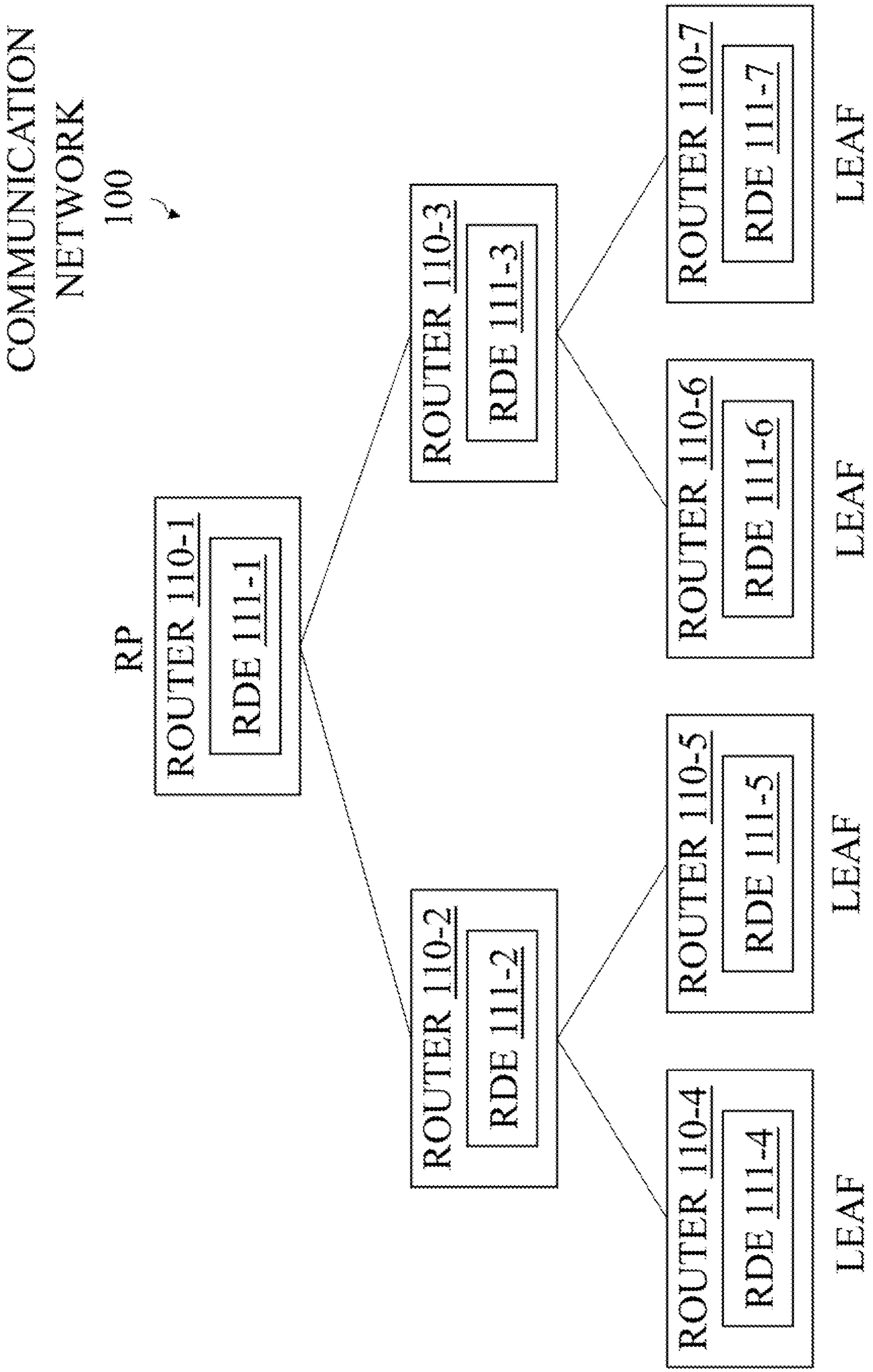
FIG. 1 depicts an example embodiment of a communication network configured to support discovery of multicast rendezvous points (RPs) for multicast trees.

Various example embodiments for supporting discovery of multicast rendezvous points (RPs) for multicast trees in communication networks are presented herein. In a communication network supporting multicast communications, the RP for a multicast group is the root node of a multicast tree (e.g., point-to-multipoint (P2MP) multicast trees, multipoint-to-multipoint (MP2MP) multicast trees, or the like), which is used by leaf nodes of a multicast group to join the multicast tree (e.g., where the leaf nodes send join requests to the RP) and to multicast messages over the multicast tree (e.g., where a sender of the multicast group multicasts a message to the receivers of the multicast group by sending the message to the RP along the multicast tree such that the RP may then forward the message along the multicast tree to all receivers of the multicast group). Various example embodiments for supporting discovery of multicast RPs for multicast trees may be configured to support discovery of multicast RPs for multicast trees by enabling candidate RP nodes to broadcast/flood advertisements with indications of multicast groups for which those candidate RP nodes intend to operate as RP nodes through one or more unicast routing protocols, and by enabling potential leaf nodes interested in those multicast groups to use such advertisements to learn/discover the candidate multicast RPs for the those multicast groups.

Various example embodiments for supporting discovery of multicast RPs for multicast trees may be configured to provide a generic capability for discovery of multicast RPs in various types of communication networks which may utilize various communication protocols. Various example embodiments for supporting discovery of multicast RPs for multicast trees may be configured to support discovery of multicast RPs for multicast trees based on advertising of RP to multicast group mappings for multicast trees. Various example embodiments for supporting discovery of multicast RPs for multicast trees may be configured to support discovery of multicast RPs for multicast trees based on use of routing protocols for advertising RP to multicast group mappings for multicast trees, as routing protocols are a common denominator in most types of communication networks.

Various example embodiments for supporting discovery of multicast RPs for multicast trees may be configured to provide a generic capability for discovery of multicast RPs in various types of communication networks which may utilize various routing protocols. Various example embodiments for supporting discovery of multicast RPs for multicast trees may be configured to support discovery of multicast RPs in various types of communication networks, such as Internet Protocol (IP) networks, non-IP networks (e.g., Multiprotocol Label Switching (MPLS) networks, Ethernet networks, Bit Index Explicit Replication (BIER) networks, or the like), or the like, as well as various combinations thereof. Various example embodiments for supporting discovery of multicast RPs for multicast trees may be configured to support discovery of multicast RPs in communication networks utilizing various routing protocols, such as an Open Shortest Path First (OSPF) protocol, an OSPF version 3 (OSPFv3) protocol, an Intermediate-System-to-Intermediate-System (IS-IS) protocol, a Border Gateway Protocol (BGP) protocol, BGP-Link State (BGP-LS) protocol, or the like, as well as various combinations thereof.

It will be appreciated that these and various other example embodiments for supporting discovery of multicast RPs for multicast trees, as well as advantages or potential advantages of example embodiments for supporting discovery of multicast RPs for multicast trees, may be further understood by way of reference to the various figures, which are discussed further below.

FIG. 1 depicts an example embodiment of a communication network configured to support discovery of multicast RPs for multicast trees.

In FIG. 1, the communication network 100 includes a set of seven routers 110-1 to 110-7 (collectively, routers 110, which also are referred to herein as routers R1-R7 or nodes R1-R7, respectively). In the communication network 100, a MP2MP multicast tree has been set up for a multicast group G. In the communication network 100, for the MP2MP multicast tree, the router 110-1 is operating as the RP for the MP2MP multicast tree and the routers 110-4, 110-5, 110-6, and 110-7 are the leaf nodes of the multicast group G for which the MP2MP multicast tree has been established. In the MP2MP multicast tree for the multicast group G, the RP (namely, router 110-1) is a special node that orchestrates formation of the MP2MP multicast tree (e.g., the RP discovers the leaf nodes in the multicast group and forms the MP2MP multicast tree to include all leaf nodes so that the leaf nodes do not need to know the addresses of the other leaf nodes in the MP2MP multicast group). In the multicast group G, since the multicast tree is a MP2MP multicast tree, each of the leaf nodes (namely, routers 110-4, 110-5, 110-6, and 110-7) can multicast packets to the other leaf nodes and receive packets multicast by the other leaf nodes. It will be appreciated that, while the routers 110 may be physically connected in various ways, the manner in which the connectivity between the routers 110 is illustrated is for purposes of explaining various aspects of the established MP2MP multicast tree. It will be appreciated that various example embodiments for supporting discovery of multicast RPs by the routers 110 may be further understood by first considering various aspects of MP2MP multicast tree setup based on use of multicast RPs.

In FIG. 1, leaf-initiated setup of the MP2MP multicast tree in the communication network 100 is based on knowledge of the RP (namely, router 110-1) by the leaf nodes (namely, router 110-4, router 110-5, router 110-6, and router 110-7). Generally speaking, in leaf-initiated MP2MP multicast tree set-up: (1) a leaf node knows only the address of the RP, (2) the tree is uniquely identified by (*, G) as opposed to (S, G) where it is noted that "S" stands for source of multicast packet and, since any leaf node could be the source of a multicast packet in a MP2MP multicast tree, the source portion is indicated as "*" (meaning wildcard), and (3) a leaf node initiates a join request to a MP2MP multicast tree with the RP by encoding (RP, *, G) in the request. In FIG. 1, assume that router 110-4 is the first leaf node in the multicast group that initiated a join request. The immediate next-hop in the shortest path from router 110-4 to the RP (router 110-1) is router 110-2. So, router 110-4 creates state for (*, G) with router 110-2 as its only upstream-downstream node and then sends a join request to router 110-2. The router 110-2, upon receiving the join request, creates state for (*, G) with router 110-4 as its first upstream-downstream node for the MP2MP multicast tree. The router 110-2 finds that the RP is its direct neighbor, so it sets up the RP as its second upstream-downstream node for the MP2MP multicast tree. The router 110-2 sends the join request to the RP. The RP, upon receiving the join request from router 110-2, creates state for (*, G) with router 110-2 as its first upstream-downstream node for the MP2MP multicast tree. Now, assume that leaf router 110-5 initiates a join request for the MP2MP multicast tree. The immediate next-hop in the shortest path from router 110-5 to the RP (router 110-1) is router 110-2. So, router 110-5 creates state for (*, G) with router 110-2 as its only upstream-downstream node and then sends a join request to router 110-2. The router 110-2, upon receiving the join request, finds that state for (*, G) already exists and sets up router 110-5 as its third upstream-downstream node for the MP2MP multicast tree. In a similar manner, leaf routers 110-6 and 110-7 set up respective segments of the M2MP multicast tree to the RP and, in the RP, router 110-3 becomes the second upstream-downstream node for the MP2MP multicast tree. Now any leaf node can multicast a packet to any other leaf node. For example, assuming that router 110-4 wants to multicast a packet to all leaf nodes in the MP2MP multicast tree, router 110-4 sends the packet to router 110-2, router 110-2 replicates the packet to router 110-5 and the RP, the RP receives the packet and forwards the packet to router 110-3, and then router 110-3 replicates the packet to router 110-6 and router 110-7.

In FIG. 1, as indicated above, the leaf-initiated setup of the MP2MP multicast tree in the communication network 100 is based on knowledge of the RP (namely, router 110-1) by the leaf nodes (namely, router 110-4, router 110-5, router 110-6, and router 110-7). The routers 110 are configured to support automated discovery of the RP by the leaf nodes. The routers 110 are configured to support automated discovery of the RP by the leaf nodes by enabling the router 110-1 to advertise its intention to operate as an RP for the multicast group G. The router 110-1, based on a determination to operate as the RP for the multicast group G, advertises a mapping of the multicast group G for which router 110-1 is interested in operating as the RP to an identifier of the router 110-1 that the router 110-1 will use to operate as the RP for the multicast group (e.g., an address of the router 110-1 or other suitable identifier). This mapping is primarily referred to herein as an RP-to-group mapping or, more generally, an RP mapping. The router 110-1 determines a routing protocol to be used for advertising the RP-to-group mapping (e.g. OSPF, OSPFv3, IS-IS, BGP-, BGP-LS, or the like), generates, based on the routing protocol, a routing protocol message including the RP-to-group mapping (e.g., encoding the information of the RP-to-group mapping) based on one or more data structures and associated fields supported by the routing protocol), and advertises the routing protocol message including the RP-to-group mapping. The intermediate routers 110-2 and 110-3 receive, process, and forward the routing protocol message including the RP-to-group mapping, such that the routing protocol message including the RP-to-group mapping is received by each of the leaf routers 110-4, 110-5, 110-6, and 110-7. The leaf routers 110-4, 110-5, 110-6, and 110-7 each receive the routing protocol message including the RP-to-group mapping and maintain the RP-to-group mapping locally so that the leaf routers 110-4, 110-5, 110-6, and 110 each have knowledge that router 110-1 is the RP for multicast group G. The routers 110 include RP discovery elements 111 (illustratively, RP discovery elements 111-1 to 111-7 in routers 110-1 to 110-7, respectively) configured to provide various RP discovery functions presented herein.

Figure 2:
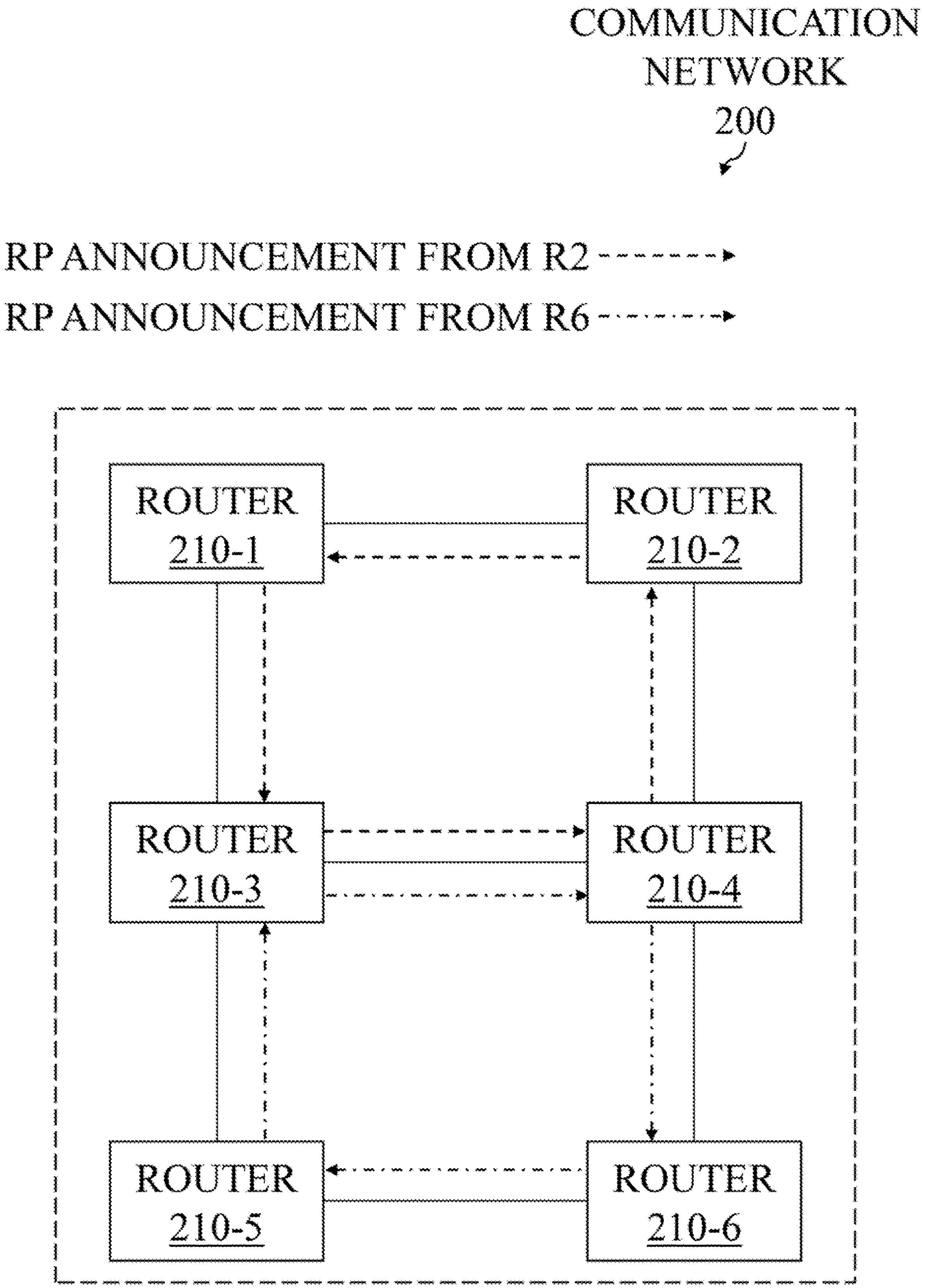
FIG. 2 depicts an example embodiment of a communication network for illustrating use of RP advertisements to advertise RP-to-group mappings using a routing protocol.

FIG. 2 depicts an example embodiment of a communication network for illustrating use of RP advertisements to advertise RP-to-group mappings using a routing protocol.

In FIG. 2, communication network 200 is an Internet Protocol (IP) network running OSPF as the routing protocol. The communication network 200 includes a set of six routers 210-1 to 210-6 (collectively, routers 210, which also are referred to herein as routers R1-R6 or nodes R1-R6, respectively). As discussed further below, the routers 210 are configured to support use of RP advertisements to advertise RP-to-group mappings. It will be appreciated that, although primarily presented with respect to use of OSPF as the routing protocol, other suitable routing protocols may be used to provide the RP advertisements for advertising RP-to-group mappings.

In the example of FIG. 2, assume that OSPF is enabled in each of the nodes R1-R6. OSPF is a link state routing protocol, so any routing information is encoded in a Link State Advertisement (LSA) packet. For example, a node may original LSAs with various types of information, such as the local loopback addresses of the node, the status of all neighboring links of the node, or the like, as well as various combinations thereof. OSPF running in a node will multicast the LSA packets to address 224.0.0.2 on all its neighboring links. When OSPF in another node receives an LSA packet, it registers the LSA information into its Link State Database (LSDB) and further multicasts the LSA to its neighbors. In that way, LSAs originated by a node are flooded across all the nodes in the network and every node builds a uniform LSDB that represents the topology and state of the network. Then, for each of the nodes, OSPF in the node computes paths/routes from the nodes to all known destinations by using a Shortest Path First (SPF) algorithm (e.g., Dijkstra's algorithm) on its LSDB.

In the example of FIG. 2, nodes R2 and R6 intend to be the candidate multicast RPs for various multicast groups. The nodes R2 and R6 send messages advertising mappings of multicast groups for which these nodes intend to be the RP to RP addresses to be used by these nodes when operating as multicast RPs for those multicast groups, respectively (e.g., for a given multicast group for which a node intends to operate as an RP for a multicast group, a mapping of the multicast group to the RP address to be used by the node when operating as the RP for the multicast group). These mappings (which may be referred to herein as RP-to-group mappings, RP mappings, or RP mapping information) are sent in LSA packets originated by the nodes R2 and R6 (which are depicted as RP announcements in FIG. 2). For example, in node R2, OSPF originates an LSA packet (illustratively, the "RP announcements from R2") that lists the multicast groups for which node R2 intends to be the RP while also including the RP address to be used by the node R2 when operating as the RP. Similarly, for example, in node R6, OSPF originates an LSA packet (illustratively, the "RP announcements from R6") that lists the multicast groups for which node R6 intends to be the RP while also including the RP address to be used by the node R6 when operating as the RP.

In the example of FIG. 2, since nodes R2 and R6 send messages including RP-to-group mappings, other nodes of the network will receive multiple RP-to-group mappings. When there are multiple candidate multicast RPs, there is a possibility that multiple multicast RPs may indicate intentions to serve the same multicast group. In that case, any node receiving RP-to-group mappings from multiple candidate multicast RPs for a given multicast group will need to select one of the candidate multicast RPs to be the RP for that multicast group. In at least some example embodiments, a node may select an RP for a multicast group, from multiple candidate RPs identified based on multiple RP-to-group mappings from the multiple RPs, as follows. (1) First, the node will look for the longest match on a multicast group. For example, assume that the node wants to join multicast group 239.1.1.1. One RP advertises that it wants to serve the 239.0.0.0/8 group range and another RP advertises that it wants to serve the 239.1.1.0/24 group range. In this case, node will prefer the second RP since 239.1.1.0/24 is the longest match. (2) When multiple multicast RPs advertise the exact same groups then the node will prefer the RP with the highest priority. Here, the highest priority for RP selection may mean the lowest priority value (e.g., 0 is the highest priority). The priority is a value configured on the RP. (3) If the groups and priority on the RP are the same then the node will look at the highest hash value from a hash function to decide the best RP to select. Here, every node implements the same hash function to ensure consistent selection of the RP for the multicast group. (4) If the groups, priorities, and hash values of the multicast RPs are the same, then the node will prefer the RP with the highest IP address. It will be appreciated that, although primarily presented with respect to example embodiments in which a node selects one of multiple candidate multicast RPs for a multicast group based on use of specific parameters in a specific order, in at least some example embodiments a node may select one of multiple candidate multicast RPs for a multicast group using fewer or more parameters, applying the parameters in a different order, or the like, as well as various combinations thereof.

In various example embodiments in which a communication network is using OSPF (as illustrated in FIG. 2), a new LSA type may be introduced in OSPF for use by nodes to advertise the RP-to-group mappings. This new LSA type is primarily referred to herein as an "RP advertisement LSA" (RP-LSA), although it will be appreciated that any other suitable name may be used to identify an LSA configured for use by nodes to advertise RP-to-group mappings. So, in the example of FIG. 2, nodes R2 and R6 multicast their respective RP-LSA packets to the address 224.0.0.2 on all neighboring links. This is illustrated in FIG. 2 with (1) the "RP announcements from R2" which are originated by node R2 to indicate its desire to become the RP for a set of multicast groups of the communication network 200 and (2) the "RP announcements from R6" which are originated by node R6 to indicate its desire to become the RP for a set of multicast groups of the communication network 200. As these RP-LSAs are flooded throughout the communication network 200, every node 210 builds a uniform database of group-to-RP mappings. Then, when a node 210 of the communication network 200 wants to join a MP2MP multicast tree for a (*, G), the node 210 looks up the RP in its local group-to-RP mappings database and initiates a join request to a MP2MP multicast tree with the RP by encoding (RP, *, G) in the request.

It will be appreciated that various example embodiments for supporting discovery of multicast RPs for multicast trees based on use of OSPF may be further understood by way of reference to various other figures presented herein.

It will be appreciated that, although primarily presented within the context of use of a particular routing protocol (namely, OSPF) within the communication network of FIG. 2 to support discovery of multicast RPs for multicast trees, various other routing protocols may be used within the communication network of FIG. 2 to support discovery of multicast RPs for multicast trees (e.g., OSPFv3, IS-IS, BGP, BGP-LS, or the like, as well as various combinations thereof).

In various example embodiments in which a communication network is using OSPFv3, IS-IS, or BGP-LS (which have been omitted for FIG. 2 for purposes of clarity), these protocols may be adapted in a manner similar to OSPF as described above in order to support discovery of multicast RPs for multicast trees in communication networks. For example, where a communication network is running OSPFv3, support for discovery of multicast RPs for multicast trees based on OSPFv3 may be based on adaptation of the OSPFv3 protocol to support a new LSA type and/or one or more other data structures configured to support advertising of RP-to-group mappings. For example, where a communication network is running IS-IS, support for discovery of multicast RPs for multicast trees based on IS-IS may be based on adaptation of the IS-IS protocol to support a new LSA type and/or one or more other data structures configured to support advertising of RP-to-group mappings. For example, where a communication network is running BGP-LS, support for discovery of multicast RPs for multicast trees based on BGP-LS may be based on adaptation of the BGP-LS protocol to support a new LSA type and/or one or more other data structures configured to support advertising of RP-to-group mappings. It will be appreciated that various example embodiments for supporting discovery of multicast RPs for multicast trees based on use of OSPFv3, IS-IS, or BGP-LS may be further understood by way of reference to various other figures presented herein.

In example embodiments in which a communication network is using BGP, BGP may be adapted in order to support discovery of multicast RPs for multicast trees in communication networks. In the case of BGP, routing information is unicast among BGP speakers. In BGP, routing information is encoded as Network Layer Reachability Information (NLRI). An NLRI type is identified by the tuple {AFI, SAFI}, where AFI stands for "Address Family Indicator" and SAFI stands for "Subsequent Address Family Indicator". For example, IPv4 routing information types use AFI as 1 and IPv6 routing information types use SAFI as 2. Then, IP multicast route uses SAFI 2 and MPLS label advertisement uses SAFI 4. So, IPv4-Unicast route is indicated by {AF=1, SAFI=1}. IPv6-Unicast route is indicated by {AFI=2, SAFI=1}, IPv4-Labelled route is indicated by {AFI=1, SAFI=4}, and so forth. A BGP node that intends to be an RP originates the list of groups into a "RP Route". In various example embodiments, a new SAFI is defined within BGP for this purpose. This new SAFI is primarily referred to herein as an "RP" SAFI, although it will be appreciated that any other suitable name may be used to identify a SAFI configured for use by nodes to advertise RP-to-group mappings. The RP route is advertised as an IPV4-RP route (AFI=1, SAFI=RP) in the case of IPV4 networks and an IPV6-RP route (AFI=2, SAFI=RP) in the case of IPV6 networks. It will be appreciated that various example embodiments for supporting discovery of multicast RPs for multicast trees based on use of BGP may be further understood by way of reference to various other figures presented herein.

Figure 3:
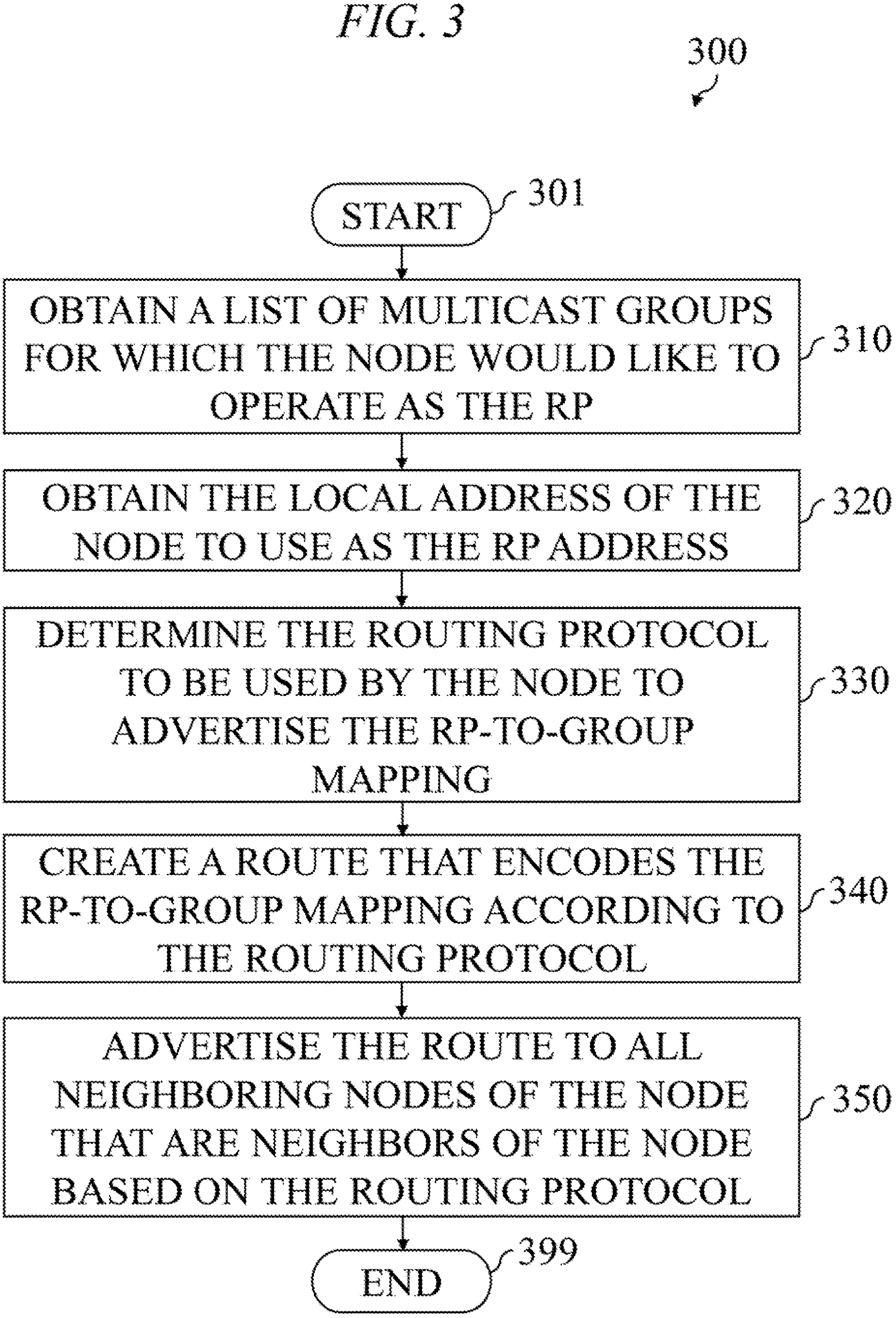
FIG. 3 depicts an example embodiment of a method for use by a node to originate an RP advertisement including RP-to-group mappings using a routing protocol.

FIG. 3 depicts an example embodiment of a method for use by a node to originate an RP advertisement including RP-to-group mappings using a routing protocol. It will be appreciated that, although primarily presented herein as being performed serially, at least a portion of the functions of method 300 may be performed contemporaneously or in a different order than as presented in FIG. 3.

At block 301, the method 300 begins.

At block 310, obtain a list of multicast groups for which the node would like to operate as the RP. The list of multicast groups may include one or more multicast groups for which the node would like to operate as the RP.

At block 320, obtain the local address of the node to use as the RP address. It will be appreciated that the type of address used as the local address may be different in different types of networks. For example, in an IP network or an MPLS network, the local address could be a loopback IPv4 or IPv6 address configured in the node. For example, in an Ethernet network, the local address could be an Ethernet MAC address assigned to the node. It will be appreciated that these types of addresses may be used in other types of networks, other types of addresses may be used in these types of networks or other types of networks, and so forth.

At block 330, determine the routing protocol to be used by the node to advertise the RP-to-group mapping (which may be denoted as a tuple as follows: tuple={address of RP, list of multicast groups}). It will be appreciated that the routing protocol may be different in different types of networks. For example, in an IP network or an MPLS network the routing protocol could be OSPF, OSPFv3, IS-IS, BGP, BGP-LS, or the like. For example, in an Ethernet network the routing protocol could be IS-IS. It will be appreciated that various other routing protocols may be used.

At block 340, create a route that encodes the RP-to-group mapping according to the routing protocol (e.g., encoding the tuple={address of RP, list of multicast groups}).

At block 350, advertise the route to all neighboring nodes of the node that are neighbors of the node based on the routing protocol. It will be appreciated that this may be a subset of the neighboring nodes to which the node is connected (e.g., where different routing protocols result in different routing protocol topologies from the node perspective).

At block 399, the method 300 ends.

Figure 4:
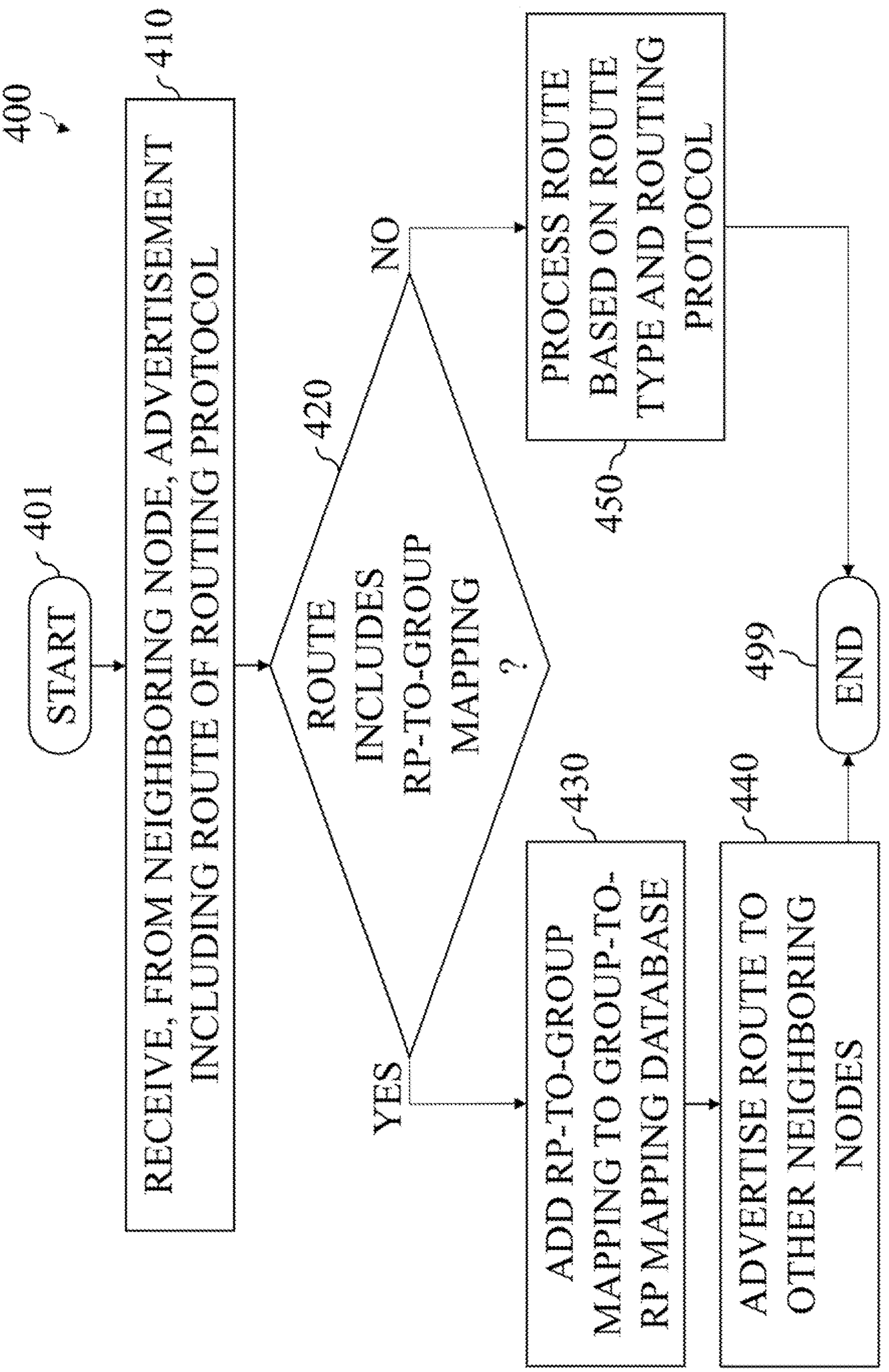
FIG. 4 depicts an example embodiment of a method for use by a node to process an RP advertisement in a routing protocol.

FIG. 4 depicts an example embodiment of a method for use by a node to process an RP advertisement in a routing protocol.

It will be appreciated that, although primarily presented herein as being performed serially, at least a portion of the functions of method 400 may be performed contemporaneously or in a different order than as presented in FIG. 4.

At block 401, the method 400 begins.

At block 410, receive, from a neighboring node, an advertisement including a route of a routing protocol. For example, the advertisement may be based on OSPF, OSPFv3, IS-IS, BGP, BGP-LS, or the like.

At block 420, determine, based on the routing protocol, whether the route includes an RP-to-group mapping. The determination as to whether the route includes an RP-to-group mapping is based on a route type determined from the route. If the route includes an RP-to-group mapping then the method 400 proceeds to block 430. If the route does not include an RP-to-group mapping then the method 400 proceeds to block 450.

At block 430, add the RP-to-group mapping to the group-to-RP mapping database. The addition of the RP-to-group mapping to the group-to-RP mapping database may include extraction of the RP-to-group mapping from the route based on the routing protocol, parsing of the RP-to-group mapping, and storage of the RP-to-group mapping in the group-to-RP mapping database. From block 430, the method 400 proceeds to block 440.

At block 440, advertise the route to all neighboring nodes, except the neighboring node from which the route was received, that are neighbors of the node based on the routing protocol. From block 440, the method 400 proceeds to block 499, where the method 400 ends.

At block 450, process the route based on the route type and the routing protocol. It will be appreciated that this may include various actions that may be performed at the node (e.g., storage of routing information, further advertising of the route, or the like, as well as various combinations thereof). From block 450, the method 400 proceeds to block 499, where the method 400 ends.

At block 499, the method 400 ends.

Various example embodiments for supporting discovery of multicast RPs for multicast trees may be used within various communication networks using OSPF as the routing protocol by supporting RP advertisements using OSPF. It will be appreciated that at least some such example embodiments may be further understood by first considering various aspects of the OSPF protocol.

OSPF distributes network topology information using Link State Advertisements (LSAs). OSPF supports various types of LSAs as follows: (1) LSA Type 1 (Router LSA), (2) LSA Type 2 (Network LSA), (3) LSA Type 3 (Summary LSA), (4) LSA Type 4 (Summary ASBR LSA), (5) LSA Type 5 (Autonomous System External LSA), (6) LSA Type 6 (Multicast OSPF LSA), (7) LSA Type 7 (Not-so-stubby Area LSA), (8) LSA Type 8 (External Attribute LSA for BGP), (9) LSA Type 9 (Link-local Scope Opaque LSA), (10) LSA Type 10 (Area-local Scope Opaque LSA), and (11) LSA Type 11 (Autonomous System Scope Opaque LSA).

OSPF, as indicated above, may be configured to support discovery of multicast RPs for multicast trees by supporting RP advertisements using OSPF (and, in particular, using OSPF Opaque LSAs). Opaque LSAs provide a generalized mechanism to allow for the future extensibility of OSPF. The information included in Opaque LSAs may be used directly by OSPF or indirectly by some application wishing to distribute information throughout the OSPF domain. Opaque LSAs include a standard LSA header followed by a 32-bit aligned application-specific information field. The Opaque LSA, like any other LSA, uses the link-state database distribution mechanism for flooding this information throughout the topology. The link-state type field of the Opaque LSA identifies the range of topological distribution of that LSA. This range is referred to as the Flooding Scope, which is why there are three Opaque LSA (namely, LSA Types 9-11), each for a distinct flooding scope. The use of Opaque LSAs for supporting discovery of multicast RPs for multicast trees may be further understood by considering the format of an OSPF LSA packet that is configured to support discovery of multicast RPs for multicast trees, where the OSPF LSA packet includes an OSPF LSA header (as illustrated in FIG. 5) and an OSPF LSA payload including one or more RP-to-group mapping element Sub-TLVs (as illustrated in FIG. 6).

Figure 5:
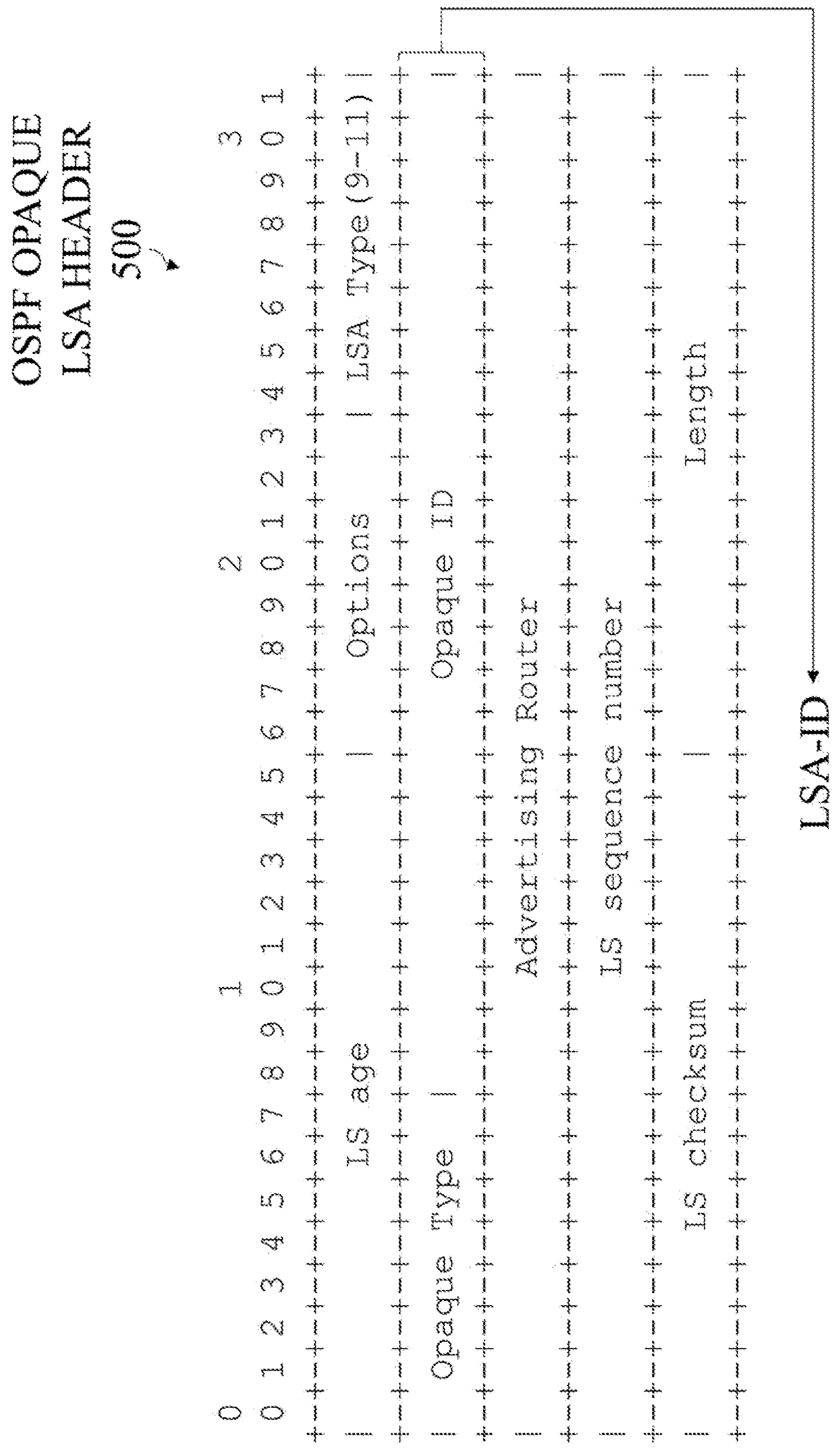
FIG. 5 depicts an example embodiment of an Opaque Link State Advertisement (LSA) header configured to support discovery of multicast RPs for multicast trees in Open Shortest Path First (OSPF)

FIG. 5 depicts an example embodiment of an Opaque LSA header configured to support discovery of multicast RPs for multicast trees in OSPF. The OSPF Opaque LSA header 500 is similar to an OSPF LSA header where the LSA-ID field is implemented using an Opaque Type field and an Opaque ID field. The OSPF Opaque LSA header 500 includes an LS Age field, an Options field, an LSA Type field, an LSA-ID field (which, as indicated above, is composed of the Opaque Type field and the Opaque ID field), an Advertising Router field, an LS Sequence Number field, an LSA Checksum field, a Length field, and a Length field. The LSA Type field is encoded with the correct type value depending on the Opaque LSA type for the required flooding scope (e.g., Type 9, Type 10, or Type 11). For Opaque LSAs, the 32-bit LSA-ID field is split into two fields as follows: (1) Opaque Type, which is an 8-bit field which indicates the type of the application specific data included in the Opaque LSA and (2) Opaque Identifier, which is a 24-bit field which encodes type-specific data. The use of the OSPF LSA packet to advertise an RP-to-group mapping may be indicated using an Opaque Type value configured to indicate that the LSA packet is advertising an RP-to-group mapping, which is encoded in the Opaque Type field of the LSA-ID field. It will be appreciated that an Opaque Type value configured to indicate that the LSA packet is advertising an RP-to-group mapping may be reserved for this purpose using any suitable available Opaque Type value (e.g., “12”, “13”, or the like). The Opaque ID field is used as an “Instance ID” which encodes any arbitrary value.

Figure 6:
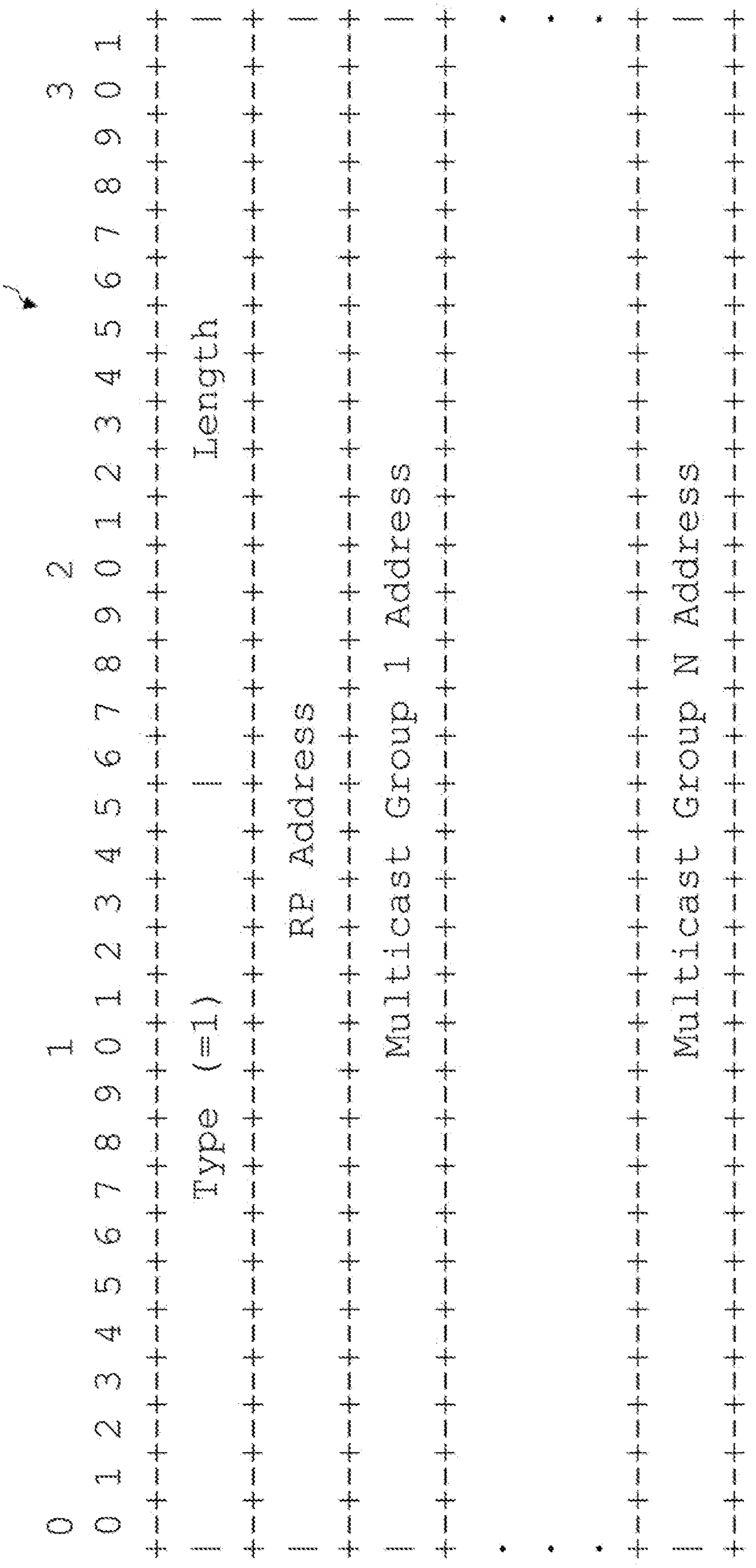
FIG. 6 depicts an example embodiment of an RP-to-group mapping element sub-TLV configured to support discovery of multicast RPs for multicast trees in OSPF.

FIG. 6 depicts an example embodiment of an RP-to-group mapping element sub-TLV configured to support discovery of multicast RPs for multicast trees in OSPF.

The RP-to-group mapping element sub-TLV 600 is configured to be included in an OSPF LSA payload of an OSPF LSA packet. The RP-to-group mapping element sub-TLV 600 includes a Type field, a Length field, an RP Address field, and N Multicast Group Address fields (denoted as Multicast Group 1 Address through Multicast Group N Address).

The RP-to-group mapping element sub-TLV 600, as indicated above, includes the Type field. The Type field is a 16-bit field that indicates the type of sub-TLV (namely, that the Sub-TLV is an RP-to-group mapping element Sub-TLV).

The RP-to-group mapping element sub-TLV 600, as indicated above, includes the Length field. The Length field is a 16-bit field that encodes the total length of the RP-to-group mapping element Sub-TLV 600.

The RP-to-group mapping element sub-TLV 600, as indicated above, includes an RP Address field. The RP Address field is a 32-bit field that encodes the IPV4 address of the RP.

The RP-to-group mapping element sub-TLV 600, as indicated above, includes the N Multicast Group Address fields. The N Multicast Group Address fields encode the list of multicast group addresses for which the node identified by the RP Address field intends to be the RP. It is noted that each of the Multicast Group Address fields is a 32-bit field that encodes the IPV4 multicast group address of the multicast group, respectively.

Various example embodiments for supporting discovery of multicast RPs for multicast trees may be used within various communication networks using OSPFv3 as the routing protocol by supporting RP advertisements using OSPFv3. It will be appreciated that the extension of OSPFv3 for supporting flooding of RP-to-group mappings in IPV6 networks may be performed in a manner similar to the extension of OSPF for supporting flooding of RP-to-group mappings in IPv4 networks as discussed above.

Various example embodiments for supporting discovery of multicast RPs for multicast trees may be used within various communication networks using IS-IS as the routing protocol by supporting RP advertisements using IS-IS. It will be appreciated that at least some such example embodiments may be further understood by first considering various aspects of the IS-IS protocol.

IS-IS, originally designed for Open System Interconnection (OSI) routing, uses TLV parameters to carry information in Link State Packets (LSPs). The TLVs make IS-IS extendable. IS-IS can therefore carry different kinds of information in the LSPs. As defined by ISO 10589. IS-IS supports only the Connectionless Network Protocol (CLNP). However, IS-IS was extended for IP routing in RFC 1195 with the registration of TLV 128 which includes a set of 12-octet fields to carry IP information.

In an IS-IS Protocol Data Unit (PDU), there is a fixed part of the header and a variable part of the header. The fixed part of the header includes fields that are always present, and the variable part of the header includes the TLV which permits the flexible encoding of parameters within link state records.

These fields are identified by one octet of type (T), one octet of length (L), and "L" octets of value (V). The Type field indicates the type of items in the Value field. The Length field indicates the length of the Value field. The Value field is the data portion of the packet. It is noted that, while not all router implementations support all TLVs, the routers will ignore and retransmit the ignored types. As explained by RFC 1195, TLV 128 extends IS-IS to carry IP routing information and Connectionless Network Service (CLNS) information in the same packet.

IS-IS, as indicated above, may be configured to support discovery of multicast RPs for multicast trees by supporting RP advertisements using IS-IS. The discovery of multicast RPs for multicast trees using IS-IS may be supported using a newly defined TLV (referred to herein as the "RP-to-group mapping TLV", although it will be appreciated that other names may be used). The encoding of the "RP-to-group mapping TLV" is depicted in FIG. 7.

FIG. 7 depicts an example embodiment of an RP-to-group mapping TLV configured to support discovery of multicast RPs for multicast trees in BGP.

The RP-to-group mapping TLV 700 includes a Type field, a Length field, a AFI field, an RP Address field, and N Multicast Group Address fields (denoted as Multicast Group 1 Address through Multicast Group N Address).

The RP-to-group mapping TLV 700, as indicated above, includes the Type field. The Type field is a 1 octet field encoding a value that identifies the TLV as being an RP-to-group mapping TLV. It will be appreciated that a Type value configured to indicate that the TLV is advertising an RP-to-group mapping may be reserved for this purpose using any suitable available value (e.g., "68", "69", or the like).

The RP-to-group mapping TLV 700, as indicated above, includes the Length field. The Length field is a 1 octet field that encodes the total length of the RP-to-group mapping TLV.

The RP-to-group mapping TLV 700, as indicated above, includes an AFI field. The AFI field is a 1 octet field that encodes the address family (e.g., IPv4, IPV6, Ethernet, or the like).

The RP-to-group mapping TLV 700, as indicated above, includes an RP Address field. The RP Address field encodes the address of the RP as per the address family indicated by the AFI field.

The RP-to-group mapping TLV 700, as indicated above, includes the N Multicast Group Address fields. The N Multicast Group Address fields encode the list of multicast group addresses for which the node identified by the RP Address field intends to be the RP. It is noted that each of the Multicast Group Address fields is a 32-bit field that encodes the IPV4 multicast group address of the multicast group, respectively.

Various example embodiments for supporting discovery of multicast RPs for multicast trees may be used within various communication networks using BGP as the routing protocol by supporting RP advertisements using BGP. It will be appreciated that at least some such example embodiments may be further understood by first considering various aspects of the BGP protocol.

In BGP, a unit of routing information is termed as Network Layer Reachability Information (NLRI). Multi-protocol (MP) capabilities of BGP introduced MP_REACH_ NLRI and MP_UNREACH_NLRI that can be used to advertise and withdraw any information other than traditional routes such as IPv4, IPv6, and so forth. The encoding of MP_REACH_NLRI is shown in FIG. 8 and the encoding of the MP_UNREACH_NLRI is shown in FIG. 9.

FIG. 8 depicts an example embodiment of an MP_REACH_NLRI for use in supporting discovery of multicast RPs for multicast trees in BGP.

The MP_REACH_NLRI 800 includes an Address Family Identifier (AFI) field, a Subsequent Address Family Identifier (SAFI) field, a Length of Next Hop Network Address field, a Network Address of Next Hop field, a Reserved field, and an NLRI field.

The MP_REACH_NLRI 800, as indicated above, includes the AFI field. The AFI field, in combination with the SAFI field, identifies the set of Network Layer protocols to which the address carried in the Next Hop field must belong, the way in which the address of the next hop is encoded, and the semantics of the network layer reachability information in the NLRI field that follows. If the Next Hop is allowed to be from more than one Network Layer protocol, the encoding of the Next Hop must provide a way to determine its Network Layer protocol.

The MP_REACH_NLRI 800, as indicated above, includes the SAFI field. The SAFI field, in combination with the AFI field, identifies the set of Network Layer protocols to which the address carried in the Next Hop must belong, the way in which the address of the next hop is encoded, and the semantics of the network layer reachability information in the NLRI field that follows. If the Next Hop is allowed to be from more than one Network Layer protocol, the encoding of the Next Hop must provide a way to determine its Network Layer protocol.

The MP_REACH_NLRI 800, as indicated above, includes the Length of Next Hop Network Address field. The Length of Next Hop Network Address field is a 1-octet field whose value expresses the length of the Network Address of Next Hop field, measured in octets.

The MP_REACH_NLRI 800, as indicated above, includes the Network Address of Next Hop field. The Network Address of Next Hop field is a variable-length field that includes the Network Address of the next router on the path to the destination system. The Network Layer protocol associated with the Network Address of the Next Hop is identified by a combination of <AFI, SAFI> carried in the attribute.

The MP_REACH_NLRI 800, as indicated above, includes the Reserved field. The Reserved field is a 1-octet field that must be set to 0, and should be ignored upon receipt.

The MP_REACH_NLRI 800, as indicated above, includes the NLRI field. The NLRI field is a variable length field that lists network layer reachability information for the feasible routes that are being advertised in this attribute. The semantics of the network layer reachability information in the NLRI field are identified by a combination of <AFI, SAFI> carried in the attribute. When the SAFI field is set to one of the values defined herein, each NLRI is encoded as specified in the NLRI encodings as presented herein.

FIG. 9 depicts an example embodiment of an MP_UNREACH_NLRI for use in supporting discovery of multicast rendezvous points for multicast trees in BGP.

The MP_UNREACH_NLRI 900 includes an Address Family Identifier (AFI) field, a Subsequent Address Family Identifier (SAFI) field, and a Withdrawn Routes field.

The MP_UNREACH_NLRI 900, as indicated above, includes the AFI field. The AFI field is a 2 octet field. The AFI field, in combination with the SAFI field, identifies the set of Network Layer protocols to which the address carried in the Next Hop field must belong, the way in which the address of the next hop is encoded, and the semantics of the Network Layer Reachability Information that follows.

The MP_UNREACH_NLRI 900, as indicated above, includes the SAFI field. The SAFI field is a 1 octet field. The SAFI field, in combination with the AFI field, identifies the set of Network Layer protocols to which the address carried in the Next Hop must belong, the way in which the address of the next hop is encoded, and the semantics of the Network Layer Reachability Information that follows.

The MP_UNREACH_NLRI 900, as indicated above, includes the Withdrawn Routes field. The Withdrawn Routes field is a variable sized field. The Withdrawn Routes field includes the list of NLRIs that are being withdrawn from service.

BGP, as indicated above, may be configured to support discovery of multicast RPs for multicast trees by supporting RP advertisements using BGP. The discovery of multicast RPs for multicast trees using BGP may be supported using a newly defined SAFI (referred to herein as an “RP SAFI”, although it will be appreciated that any other suitable name may be used) which is configured to indicate that the NLRI encodes RP-to-group mapping information (referred to herein as an “RP-to-group mapping NLRI”, although it will be appreciated that any other suitable name may be used). The RP SAFI can be used with IPv4 AFI (=1) or IPv6 AFI (=2) depending on the IP address family used by the multicast network. The RP-to-group mapping NLRI that is encoded in the RF SAFI is depicted in FIG. 10.

Figure 10:
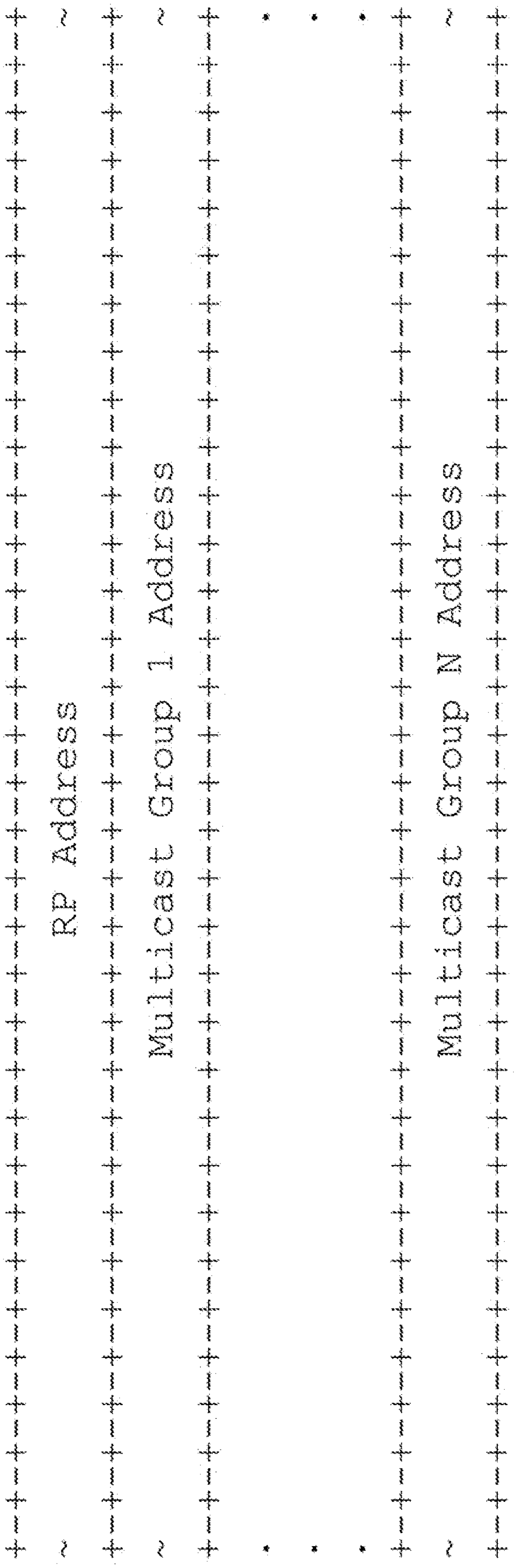
FIG. 10 depicts an example embodiment of an RP-to-group mapping NLRI for use in supporting discovery of multicast RPs for multicast trees in BGP.

FIG. 10 depicts an example embodiment of an RP-to-group mapping NLRI for use in supporting discovery of multicast RPs for multicast trees in BGP.

The RP-to-group mapping NLRI 1000 includes an RP Address field and N Multicast Group Address fields (denoted as Multicast Group 1 Address through Multicast Group N Address). If the AFI is IPV4, then the RP Address and the Multicast Group Addresses are 32-bit IPv4 addresses. If the AFI is IPV6 then the RP Address and the Multicast Group Addresses are 128-bit IPv6 addresses.

Various example embodiments for supporting discovery of multicast RPs for multicast trees may be used within various communication networks using BGP-LS as the routing protocol by supporting RP advertisements using BGP-LS. It will be appreciated that the extension of BGP-LS for supporting flooding of RP-to-group mappings may be performed in a manner similar to the extension of BGP for supporting flooding of RP-to-group mappings as discussed above.

Figure 11:
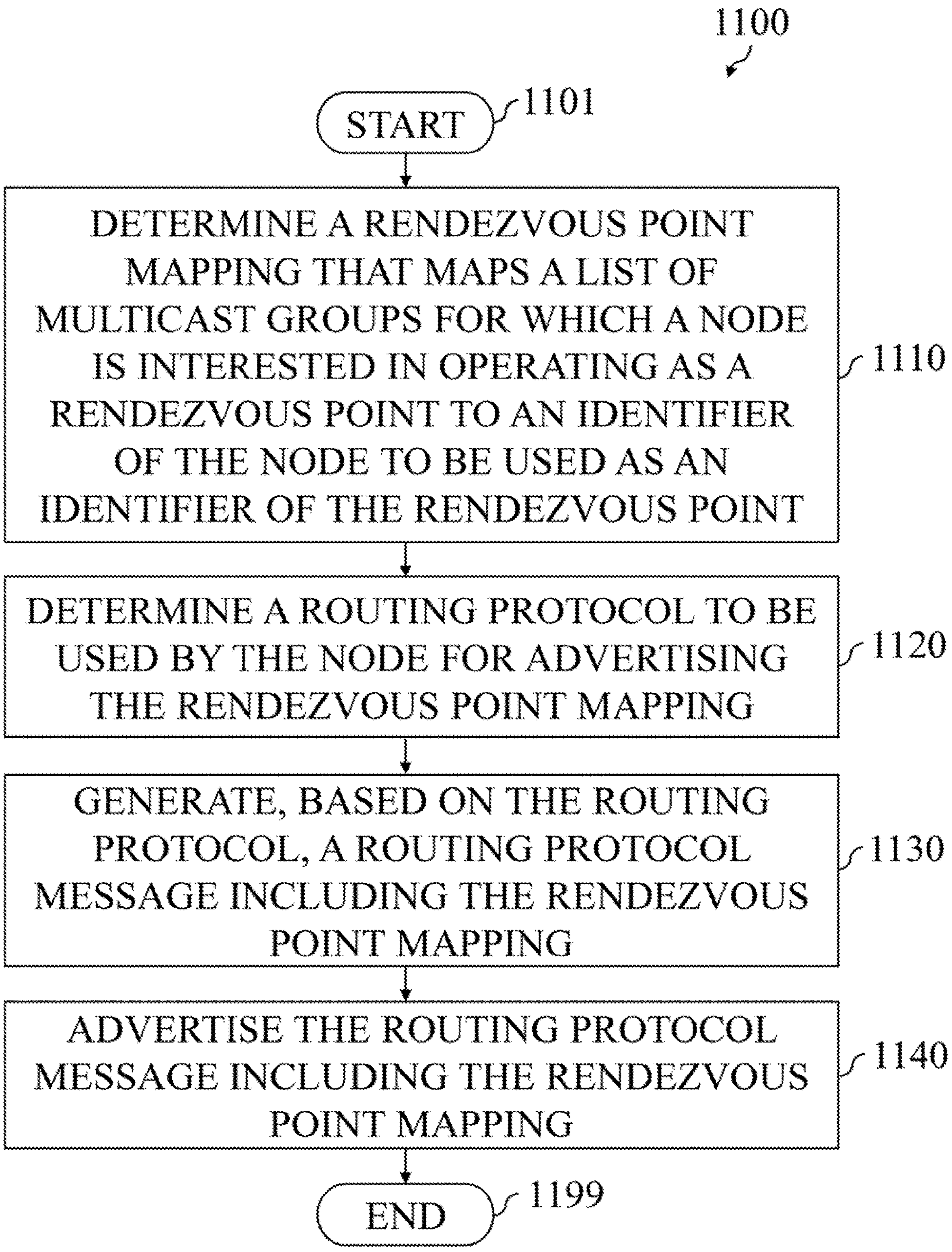
FIG. 11 depicts an example embodiment of a method for use by a node to originate a rendezvous point advertisement.

FIG. 11 depicts an example embodiment of a method for use by a node to originate a rendezvous point advertisement. It will be appreciated that, although primarily presented herein as being performed serially, at least a portion of the functions of method 1100 may be performed contemporaneously or in a different order than as presented in FIG. 11. At block 1101, the method 1100 begins. At block 1110, determine a rendezvous point mapping that maps a list of multicast groups for which a node is interested in operating as a rendezvous point to an identifier of the node to be used as an identifier of the rendezvous point. At block 1120, determine a routing protocol to be used by the node for advertising the rendezvous point mapping. At block 1130, generate, based on the routing protocol, a routing protocol message including the rendezvous point mapping. At block 1140, advertise the routing protocol message including the rendezvous point mapping. At block 1199, the method 1100 ends. It will be appreciated that various other functions presented herein may be implemented within the context of the method 1100 of FIG. 11.

Figure 12:
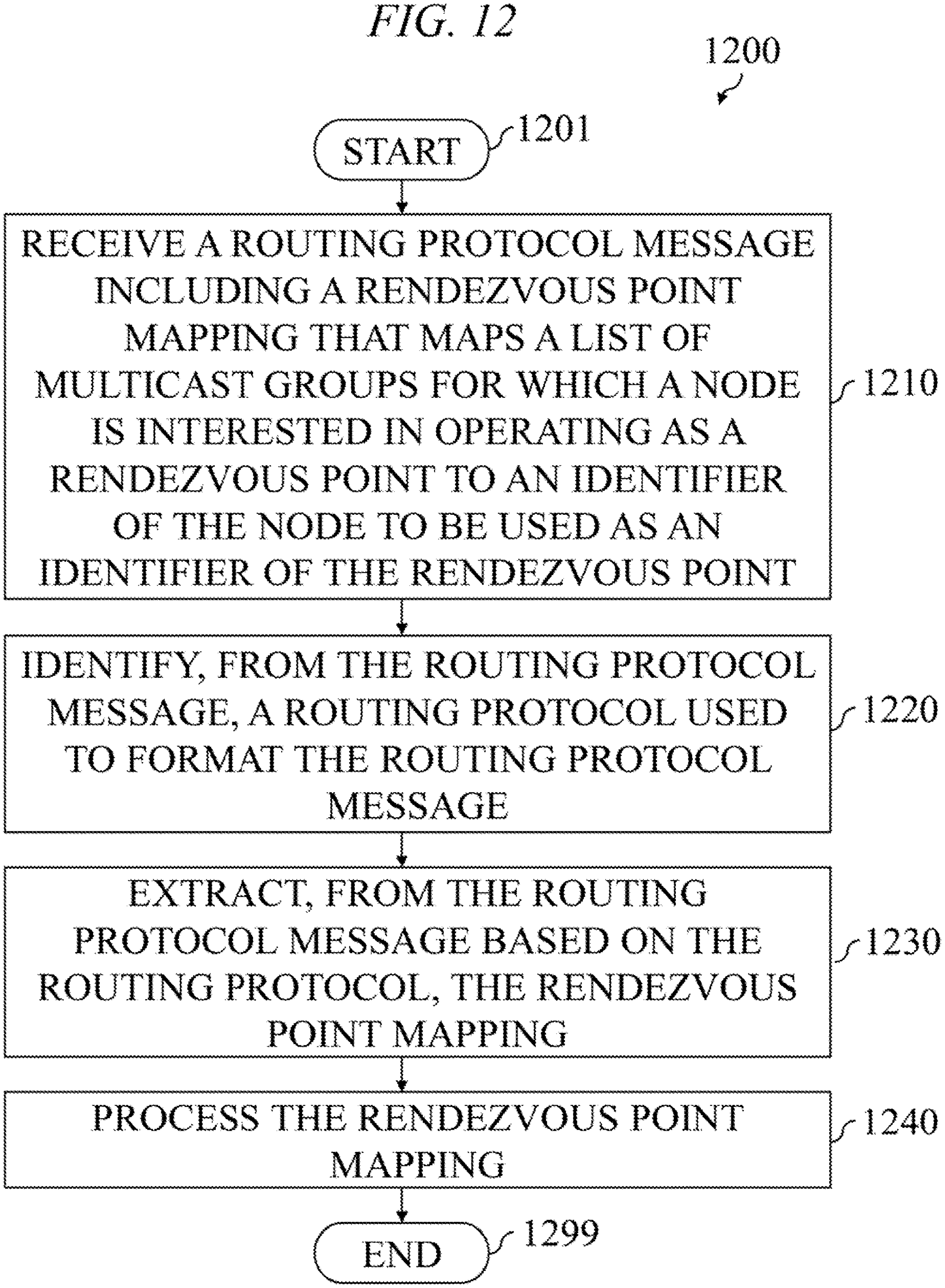
FIG. 12 depicts an example embodiment of a method for use by a node to process a rendezvous point advertisement.

FIG. 12 depicts an example embodiment of a method for use by a node to process a rendezvous point advertisement. It will be appreciated that, although primarily presented herein as being performed serially, at least a portion of the functions of method 1200 may be performed contemporaneously or in a different order than as presented in FIG. 12. At block 1201, the method 1200 begins. At block 1210, receive a routing protocol message including a rendezvous point mapping that maps a list of multicast groups for which a node is interested in operating as a rendezvous point to an identifier of the node to be used as an identifier of the rendezvous point. At block 1220, identify, from the routing protocol message, a routing protocol used to format the routing protocol message. At block 1230, extract, from the routing protocol message based on the routing protocol, the rendezvous point mapping. At block 1240, process the rendezvous point mapping. At block 1299, the method 1200 ends. It will be appreciated that various other functions presented herein may be implemented within the context of the method 1200 of FIG. 12.

Various example embodiments for supporting discovery of multicast RPs for multicast trees may provide various advantages or potential advantages. For example, various example embodiments for supporting discovery of multicast RPs for multicast trees may be configured to provide an efficient control plane for setting up multicast trees, including for MP2MP multicast trees. For example, various example embodiments for supporting discovery of multicast RPs for multicast trees may be configured to provide a generic mechanism for discovery of multicast RPs that can be used in various types of communication networks (e.g., IP, MPLS, Ethernet, BIER or the like) which may utilize various routing protocols (e.g., OSPF, OSPFv3, IS-IS, BGP, BGP-LS, or the like). For example, various example embodiments for supporting discovery of multicast RPs for multicast trees may be configured to support, for each of the leaf nodes, automated discovery of the pool of multicast RPs available for a given multicast group. For example, various example embodiments for supporting discovery of multicast RPs for multicast trees may be configured to support discovery of multicast RPs for multicast trees in IP networks that utilize PIM as the control protocol for setting up IP multicast trees, as a replacement for PIM BSR functionality (which is a less-efficient two-step mechanism) in PIM-enabled IP networks since other routing protocols (e.g., OSPF, OSPFv3, IS-IS, BGP, BGP-LS, or the like) are available in IP networks. For example, various example embodiments for supporting discovery of multicast RPs for multicast trees may be configured to support discovery of multicast RPs for multicast trees for more than just IP networks that utilize PIM as the control protocol for setting up IP multicast trees. For example, various example embodiments for supporting discovery of multicast RPs for multicast trees may be configured to support discovery of multicast RPs for multicast trees in MPLS networks that utilize mLDP as the control protocol for setting up MPLS multicast trees, thereby obviating the need for manual configuration of the multicast RPs for the MPLS multicast trees in each of the leaf nodes of the MPLS multicast trees. For example, various example embodiments for supporting discovery of multicast RPs for multicast trees may be configured to obviate the need to manually configure the multicast RP at each leaf node of a MP2MP multicast tree as such manual configuration operations are often cumbersome and prone to error and, generally, are not scalable (e.g., a leaf node may have registered for many thousands of multicast groups and multicast RPs can differ among multicast groups), although it will be appreciated that such manual configuration capabilities still may be supported and used where necessary or desirable. It will be appreciated that various example embodiments for supporting discovery of multicast RPs for multicast trees may provide various other advantages or potential advantages.

Figure 13:
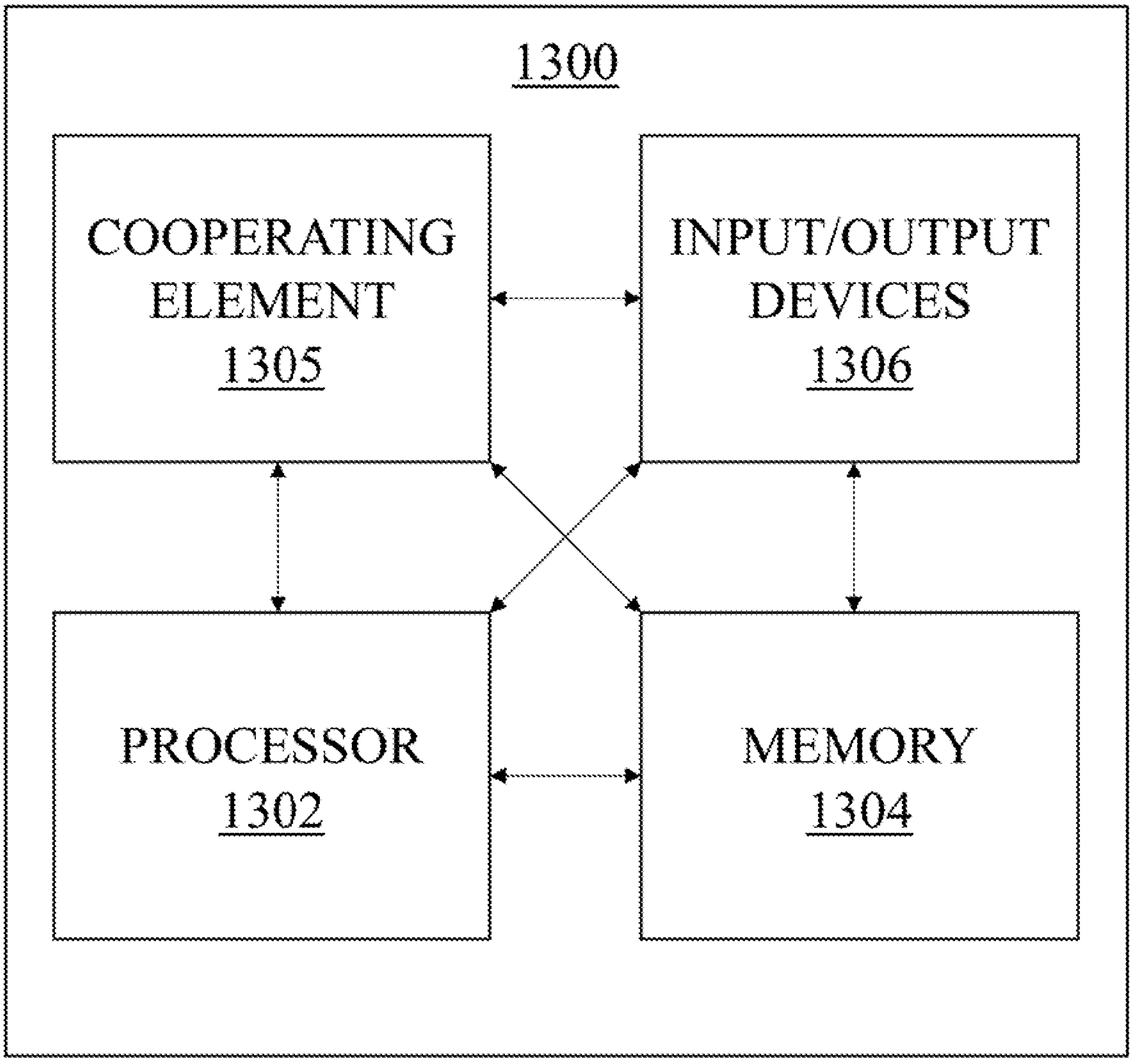
FIG. 13 depicts an example embodiment of a computer suitable for use in performing various functions presented herein.

FIG. 13 depicts an example embodiment of a computer suitable for use in performing various functions presented herein.

The computer 1300 includes a processor 1302 (e.g., a central processing unit (CPU), a processor, a processor having a set of processor cores, a processor core of a processor, or the like) and a memory 1304 (e.g., a random access memory (RAM), a read-only memory (ROM), or the like). In at least some example embodiments, the computer 1300 may include at least one processor and at least one memory including instructions that, when executed by the at least one processor, cause the computer to perform various functions presented herein.

The computer 1300 also may include a cooperating element 1305. The cooperating element 1305 may be a hardware device. The cooperating element 1305 may be a process that can be loaded into the memory 1304 and executed by the processor 1302 to implement various functions presented herein (in which case, for example, the cooperating element 1305 (including associated data structures) can be stored on a non-transitory computer readable medium, such as a storage device or other suitable type of storage element (e.g., a magnetic drive, an optical drive, or the like)).

The computer 1300 also may include one or more input/output devices 1306. The input/output devices 1306 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 1300 may represent a general architecture and functionality suitable for implementing functional elements described herein, portions of functional elements described herein, or the like, as well as various combinations thereof. For example, the computer 1300 may provide a general architecture and functionality that is suitable for implementing one or more elements presented herein. For example, the computer 1300 may provide a general architecture and functionality that is suitable for implementing at least one of a node or a portion thereof, a rendezvous point or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer readable media), transmitted via a data stream in a broadcast or other signal bearing medium, and/or stored within a memory within a computing device operating according to the instructions.

It will be appreciated that the term "non-transitory" as used herein is a limitation of the medium itself (i.e., tangible, not a signal) as opposed to a limitation of data storage persistency (e.g., RAM versus ROM).

It will be appreciated that, as used herein, "at least one of <a list of two or more elements>" and "at least one of the following: <a list of two or more elements>" and similar wording, where the list of two or more elements are joined by "and" or "or", mean at least any one of the elements, or at least any two or more of the elements, or at least all the elements.

It will be appreciated that, as used herein, the term "or" refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:

at least one processor; and at least one memory including instructions which, when executed by the at least one processor, cause the apparatus at least to:

determine a rendezvous point mapping that maps a list of multicast groups for which a node is interested in operating as a rendezvous point to an identifier of the node to be used as an identifier of the rendezvous point;

determine a routing protocol to be used by the node for advertising the rendezvous point mapping;

generate, based on the routing protocol, a routing protocol message including the rendezvous point mapping; and advertise the routing protocol message including the rendezvous point mapping.

2. The apparatus of claim 1, wherein, to determine the rendezvous point mapping, the instructions, when executed by the at least one processor, cause the apparatus at least to:

obtain the list of multicast groups for which the node is interested in operating as the rendezvous point;

obtain the identifier of the node to be used as the identifier of the rendezvous point; and generate the rendezvous point mapping by associating the list of multicast groups for which the node is interested in operating as the rendezvous point to the identifier of the node to be used as the identifier of the rendezvous point.

3. The apparatus of claim 1, wherein the node has a plurality of neighbor nodes associated therewith, wherein, to advertise the routing protocol message including the rendezvous point mapping, the instructions, when executed by the at least one processor, cause the apparatus at least to:

forward the routing protocol message including the rendezvous point mapping toward each of the neighbor nodes associated therewith.

4. The apparatus of claim 1, wherein the routing protocol includes one of an Open Shortest Path First (OSPF) protocol, an OSPF version 3 (OSPFv3) protocol, an Intermediate- System-to-Intermediate-System (IS-IS) protocol, a Border Gateway Protocol (BGP), or a BGP-Link State (BGP-LS) protocol.

5. The apparatus of claim 1, wherein the routing protocol includes an Open Shortest Path First (OSPF) protocol, wherein the routing protocol message includes an Opaque Link State Advertisement (LSA), wherein the rendezvous point mapping is included within a payload of the Opaque LSA.

6. The apparatus of claim 5, wherein the Opaque LSA Header includes an LSA Type field and an LSA Identifier field, wherein the LSA Type field includes a value based on flooding scope, wherein the LSA Identifier field is split into an Opaque Type field and an Opaque Identifier field, wherein the Opaque Type field includes a value indicative that the Opaque LSA includes rendezvous point mapping information.

7. The apparatus of claim 5, wherein the rendezvous point mapping is included within a sub-Type-Length-Value (sub-TLV) included within the payload of the Opaque LSA, wherein the sub-TLV includes a rendezvous point address field that includes the identifier of the node to be used as the identifier of the rendezvous point, wherein the sub-TLV includes a set of one or more multicast address fields that include respective multicast addresses for the respective multicast groups for which the node is interested in operating as the rendezvous point.

8. The apparatus of claim 1, wherein the routing protocol includes an Intermediate-System-to-Intermediate-System (IS-IS) protocol, wherein the routing protocol message includes an IS-IS Protocol Data Unit (PDU), wherein the rendezvous point mapping is included within a Type-Length-Value (TLV) of the IS-IS PDU.

9. The apparatus of claim 8, wherein the TLV of the IS-IS PDU includes a Type field that encodes a value indicative that the IS-IS PDU includes rendezvous point mapping information and a Value field that includes the rendezvous point mapping.

10. The apparatus of claim 9, wherein the Value field includes an Address Family Identifier (AFI) field, wherein the Value field includes a rendezvous point address field that includes the identifier of the node to be used as the identifier of the rendezvous point, wherein the Value field includes a set of one or more multicast address fields that include respective multicast addresses for the respective multicast groups for which the node is interested in operating as the rendezvous point.

11. The apparatus of claim 1, wherein the routing protocol includes a Border Gateway Protocol (BGP), wherein the routing protocol message includes a BGP message including Network Layer Reachability Information (NLRI), wherein the rendezvous point mapping is included within the NLRI.

12. The apparatus of claim 11, wherein the NLRI includes a Subsequent Address Family Identifier (SAFI) field and an NLRI field, wherein the SAFI field includes a value indicative that the NLRI includes rendezvous point mapping information, wherein the NLRI field includes a rendezvous point address field that includes the identifier of the node to be used as the identifier of the rendezvous point, wherein the NLRI field includes a set of one or more multicast address fields that include respective multicast addresses for the respective multicast groups for which the node is interested in operating as the rendezvous point.

13. A method, comprising:
- determining a rendezvous point mapping that maps a list of multicast groups for which a node is interested in operating as a rendezvous point to an identifier of the node to be used as an identifier of the rendezvous point;
- determining a routing protocol to be used by the node for advertising the rendezvous point mapping;
- generating, based on the routing protocol, a routing protocol message including the rendezvous point mapping; and
- advertising the routing protocol message including the rendezvous point mapping.

14. An apparatus, comprising:
- at least one processor; and
- at least one memory including instructions which, when executed by the at least one processor, cause the apparatus at least to:
  - receive a routing protocol message including a rendezvous point mapping that maps a list of multicast groups for which a node is interested in operating as a rendezvous point to an identifier of the node to be used as an identifier of the rendezvous point;
  - identify, from the routing protocol message, a routing protocol used to format the routing protocol message;
  - extract, from the routing protocol message based on the routing protocol, the rendezvous point mapping; and
  - process the rendezvous point mapping.

15. The apparatus of claim 14, wherein, to process the rendezvous point mapping, the instructions, when executed by the at least one processor, cause the apparatus at least to:
- add the rendezvous point mapping to a group to rendezvous point mapping database.

16. The apparatus of claim 14, wherein the routing protocol message is received from a neighbor node, wherein the routing protocol message is advertised to at least one other neighbor node.

17. The apparatus of claim 14, wherein the routing protocol includes one of an Open Shortest Path First (OSPF) protocol, an OSPF version 3 (OSPFv3) protocol, an Intermediate-System-to-Intermediate-System (IS-IS) protocol, a Border Gateway Protocol (BGP), or a BGP-Link State (BGP-LS) protocol.

18. The apparatus of claim 14, wherein the routing protocol includes an Open Shortest Path First (OSPF) protocol, wherein the routing protocol message includes an Opaque Link State Advertisement (LSA), wherein the rendezvous point mapping is included within a payload of the Opaque LSA.

19. The apparatus of claim 18, wherein the Opaque LSA Header includes an LSA Type field and an LSA Identifier field, wherein the LSA Type field includes a value based on flooding scope, wherein the LSA Identifier field is split into an Opaque Type field and an Opaque Identifier field, wherein the Opaque Type field includes a value indicative that the Opaque LSA includes rendezvous point mapping information.

20. The apparatus of claim 18, wherein the rendezvous point mapping is included within a sub-Type-Length-Value (sub-TLV) included within the payload of the Opaque LSA, wherein the sub-TLV includes a rendezvous point address field that includes the identifier of the node to be used as the identifier of the rendezvous point, wherein the sub-TLV includes a set of one or more multicast address fields that include respective multicast addresses for the respective multicast groups for which the node is interested in operating as the rendezvous point.

21. The apparatus of claim 14, wherein the routing protocol includes an Intermediate-System-to-Intermediate-System (IS-IS) protocol, wherein the routing protocol message includes an IS-IS Protocol Data Unit (PDU), wherein the rendezvous point mapping is included within a Type-Length-Value (TLV) of the IS-IS PDU.

22. The apparatus of claim 21, wherein the TLV of the IS-IS PDU includes a Type field that encodes a value indicative that the IS-IS PDU includes rendezvous point mapping information and a Value field that includes the rendezvous point mapping.

23. The apparatus of claim 22, wherein the Value field includes an Address Family Identifier (AFI) field, wherein the Value field includes a rendezvous point address field that includes the identifier of the node to be used as the identifier of the rendezvous point, wherein the Value field includes a set of one or more multicast address fields that include respective multicast addresses for the respective multicast groups for which the node is interested in operating as the rendezvous point.

24. The apparatus of claim 14, wherein the routing protocol includes a Border Gateway Protocol (BGP), wherein the routing protocol message includes a BGP message including Network Layer Reachability Information (NLRI), wherein the rendezvous point mapping is included within the NLRI.

25. The apparatus of claim 24, wherein the NLRI includes a Subsequent Address Family Identifier (SAFI) field and an NLRI field, wherein the SAFI field includes a value indicative that the NLRI includes rendezvous point mapping information, wherein the NLRI field includes a rendezvous point address field that includes the identifier of the node to be used as the identifier of the rendezvous point, wherein the NLRI field includes a set of one or more multicast address fields that include respective multicast addresses for the respective multicast groups for which the node is interested in operating as the rendezvous point.

26. A method, comprising:

receiving a routing protocol message including a rendezvous point mapping that maps a list of multicast groups for which a node is interested in operating as a rendezvous point to an identifier of the node to be used as an identifier of the rendezvous point;

identifying, from the routing protocol message, a routing protocol used to format the routing protocol message;

extracting, from the routing protocol message based on the routing protocol, the rendezvous point mapping; and processing the rendezvous point mapping.

* * * * *